US009532136B2

(12) United States Patent
Uhle et al.

(10) Patent No.: US 9,532,136 B2
(45) Date of Patent: Dec. 27, 2016

(54) SEMANTIC AUDIO TRACK MIXER

(71) Applicant: Fraunhofer-Gesellschaft zur Foerderung der angewandten Forschung e.V., Munich (DE)

(72) Inventors: Christian Uhle, Nuremberg (DE); Juergen Herre, Buckenhof (DE); Harald Popp, Tuchenbach (DE); Falko Ridderbusch, Nuremberg (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 301 days.

(21) Appl. No.: 13/955,296

(22) Filed: Jul. 31, 2013

(65) Prior Publication Data
US 2014/0037111 A1 Feb. 6, 2014

Related U.S. Application Data

(63) Continuation of application No. PCT/EP2012/050365, filed on Jan. 11, 2012.

(30) Foreign Application Priority Data

Feb. 3, 2011 (EP) ...................... 11153211

(51) Int. Cl.
*H04R 3/00* (2006.01)
*H04H 60/04* (2008.01)
*G10L 15/22* (2006.01)

(52) U.S. Cl.
CPC ................ *H04R 3/00* (2013.01); *H04H 60/04* (2013.01); *G10L 15/22* (2013.01)

(58) Field of Classification Search
None
See application file for complete search history.

(56) References Cited

U.S. PATENT DOCUMENTS 5,844,992 A * 12/1998 Boyer ............................. 381/57
6,931,134 B1   8/2005 Waller, Jr. et al.
(Continued)

FOREIGN PATENT DOCUMENTS

CN   1684398        10/2005
EP   1 995 721 A1   11/2008
(Continued)

OTHER PUBLICATIONS

Avid Technologies "Pro Tools Reference Guide Version 9.0." http://www.avid.com/static/resources/us/documents/protoolsreferenceguide.pdf. 2010. pp. 1-1222.*
(Continued)

*Primary Examiner* — Curtis Kuntz
*Assistant Examiner* — Qin Zhu
(74) *Attorney, Agent, or Firm* — Keating & Bennett, LLP

(57) ABSTRACT

An audio mixer for mixing a plurality of audio tracks to a mixture signal has a semantic command interpreter for receiving a semantic mixing command and for deriving a plurality of mixing parameters for the plurality of audio tracks from the semantic mixing command; an audio track processor for processing the plurality of audio tracks in accordance with the plurality of mixing parameters; and an audio track combiner for combining the plurality of audio tracks processed by the audio track processor into the mixture signal. A corresponding method has: receiving a semantic mixing command; deriving a plurality of mixing parameters for the plurality of audio tracks from the semantic mixing command; processing the plurality of audio tracks in accordance with the plurality of mixing parameters; and combining the plurality of audio tracks resulting from the processing of the plurality of audio tracks to form the mixture signal.

20 Claims, 16 Drawing Sheets

(56) References Cited

U.S. PATENT DOCUMENTS

| | | | |
|---|---|---|---|
| 7,308,324 B2 | 12/2007 | Ono | |
| 7,778,823 B2 | 8/2010 | Carson | |
| 8,812,323 B2* | 8/2014 | Tong et al. | 704/257 |
| 2002/0087310 A1 | 7/2002 | Lee et al. | |
| 2005/0070337 A1 | 3/2005 | Byford et al. | |
| 2005/0207597 A1 | 9/2005 | Kageyama | |
| 2007/0124293 A1* | 5/2007 | Lakowske et al. | 707/3 |
| 2008/0059195 A1 | 3/2008 | Brown | |
| 2008/0221895 A1* | 9/2008 | Pauws et al. | 704/270 |
| 2009/0259473 A1* | 10/2009 | Chang et al. | 704/260 |
| 2010/0241963 A1* | 9/2010 | Kulis et al. | 715/727 |
| 2010/0250253 A1 | 9/2010 | Shen | |
| 2010/0299151 A1* | 11/2010 | Soroka | G11B 27/105 704/500 |

FOREIGN PATENT DOCUMENTS

| | | |
|---|---|---|
| JP | 2008-197270 A | 8/2008 |
| KR | 1996-0706258 A | 11/1996 |
| RU | 2 376 654 C2 | 12/2009 |
| WO | 95/12274 A1 | 5/1995 |
| WO | 2006/084916 A2 | 8/2006 |
| WO | 2010/111373 A1 | 9/2010 |

OTHER PUBLICATIONS

Jindai et al "A Study on Robot-Human System with Consideration of Individual Preferences (2nd Report, Multimodal Human-Machine Interface for Object-Handing Robot System)." JSME International Journal Series C Mechanical Systems, Machine Elements and Manufacturing vol. 49 (2006) No. 4 p. 1033-1039.*

Gearslutz, "voice-controlled logic/DAW." pp. 1-7. Aug. 3, 2007. https://www.gearslutz.com/board/music-computers/137329-voice-controlled-logic-daw.html.*

Official Communication issued in corresponding Russian Patent Application No. 2013140574, mailed on Nov. 27, 2014.

Official Communication issued in International Patent Application No. PCT/EP2012/050365, mailed on Mar. 16, 2012.

Kwong et al., "Transient Detection of Audio Signals Based on an Adaptive Comb Filter in the Frequency Domain," Asilomar Conference on Signals, Systems & Computers, vol. 1, Nov. 9, 2003, pp. 542-545.

Rayleigh, "XII. On our Perception of Sound Direction," Philosophical Magazine Series 6, pp. 214-232.

Perez_Gonzalez et al., "Automatic Equalization of Multi-Channel Audio Using Cross-Adaptive Methods," AES Convention Paper 7830, 127th Convention, Oct. 9-12, 2009, pp. 1-6.

Vercoe et al., "Structured Audio: Creation, Transmission, and Rendering of Parametric Sound Representations," Proceedings of the IEEE, vol. 86, No. 5, May 1998, pp. 922-940.

Ong, "Structural Analysis and Segmentation of Music Signals," A Dissertation Submitted to the Department of Technology of the Universitat Pompeu Fabra, 2006, 181 pages.

Moore et al., "A Revision of Zwicker's Loudness Model," Acustuca, vol. 82, 1996, pp. 335-345.

Vinet et al., "SemanticHIFI IST-507913," SemanticHIFI Final Report Version 1, Nov. 12, 2006, pp. 1-59.

Official Communication issued in corresponding Russian Patent Application No. 2013140574, mailed on Aug. 20, 2015.

Official Communication issued in corresponding Chinese Patent Application No. 201280016075.8, mailed on Nov. 25, 2015.

Official Communication issued in corresponding Korean Patent Application No. 10-2013-7022973, mailed on Jul. 8, 2014.

* cited by examiner

FIGUR 12

SEMANTIC AUDIO TRACK MIXER

CROSS-REFERENCE TO RELATED APPLICATIONS

This application is a continuation of copending International Application No. PCT/EP2012/050365, filed Jan. 11, 2012, which is incorporated herein by reference in its entirety, and additionally claims priority from European Application No. 11153211.5, filed Feb. 3, 2011, which is also incorporated herein by reference in its entirety.

BACKGROUND OF THE INVENTION

The field of the present invention is related to an audio mixer for mixing of multi-track signals according to user specifications. It is related to audio signal processing, in particular to the task of mixing a multi-track recording according to a set of user-defined criteria. The field of the invention is further related to a method for mixing a plurality of audio tracks to a mixture signal. The field of the invention is also related to a computer program for instructing a computer to perform the method for mixing a plurality of audio tracks.

The ever-growing availability of multimedia content yields new ways for the user to enjoy music and to interact with music. These possibilities are accompanied by the challenge to develop the tools for assisting the user in such activities.

From the perspective of information retrieval, this challenge has been taken more than a decade ago, leading to the vibrant research area of music information retrieval and numerous commercial applications.

A different aspect which has not been addressed to this extent is the interaction with content which is available in a multi-track format. A multi-track format can consist of separate and time-aligned signals (also known as single tracks (ST)) for each sound object (SO) or groups of objects (stems). According to one definition, stems are the individual components of a mix, separately saved (usually to disc or tape) for the purpose of use in a remix.

In the traditional process of music production, multiple single tracks are combined in a sophisticated manner into a mixture signal (MS) which is then delivered to the end user. The ongoing evolution of digital audio technologies, e.g. the development of new audio formats for parametric object-based audio, enables the interaction with music to a much larger extent. The user has access to multi-track recordings and can actively control the mixing process. Some artists have begun releasing the stems for some of their songs, the intention being that listeners can freely remix and reuse the music in any way desired.

A musical or audio work released in multi-track format can be used in numerous ways. The user may control the mixing parameters for the different tracks, thus emphasising selected tracks while attenuating other tracks. One or more tracks may be muted, for example for the purposes of karaoke or play-along. Sound effects, such as echo, reverberation, distortion, chorus etc., may be applied to selected tracks without affecting the other tracks. One or more tracks may be excerpted from the multi-track format and can be used in another musical work or another form of audio work, such as an audio book, a lecture, a podcast, etc. In the following description, an application of the teachings disclosed herein discusses, in an exemplary manner, the mastering of a recorded musical work. It should be understood, however, that the processing of any recorded sound involving mixing a plurality of single audio tracks is intended to be equally addressed and covered by the teachings disclosed herein.

Automatic mixing has been, and still is, the focus of a number of research projects. In 2009, Perez-Gonzalez et al. described a method for automatic equalization of multi-track signals (E. Perez-Gonzalez and J. Reiss, "Automatic Equalization of Multi-Channel Audio Using Cross-Adaptive Methods", Proc. of the AES 127$^{th}$ Conv., 2009). The authors present a method for automatically setting the attenuation for each signal of a multi-track signal. The gains are determined such that the loudness of each signal equals the average loudness of all signals. Another article by the same authors addressed "Automatic Gain and Fader Control for Live Mixing" and was published in Proc. of WASPAA, 2009.

Semantic HiFi is the name of the European Project IST-507913 (H. Vinet et al., "Semantic HiFi Final Report", Final Report of IST-507913, 2006). It is mainly related to the retrieval, browsing, and sharing of multimedia content. This comprises browsing and navigating in databases, playlist generation, intra-track navigation (using structural analysis like verse-chorus identification), and meta-data sharing. It also addresses the interaction/authoring/editing: generating mixes including synchronization (that is "concatenating" audio signals, not mixing multi-track signals), voice transformation, rhythm transformation, voice controlled instruments, and effects.

Another project is known under the designation "Structured Audio" or MPEG 4. Structured Audio enables the transmission of audio signals at low bit-rates and perceptually based manipulation and access of sonic data using symbolic and semantic description of the signals (cf. B. L. Vercoe and W. G. Gardner and E. D. Scheirer, "Structured Audio: Creation, Transmission, and Rendering of Parametric Sound Representations", Proc. of IEEE, vol. 86, pp. 922-940, 1998). It features a description of parametric sound post-production for mixing multiple streams and adding audio effects. The parametric descriptions determine how the sounds are synthesized. Structured audio is related to synthesizing audio signals.

In the international patent application published under international publication number WO 2010/111373 A1, a context aware, speech-controlled interface and system is disclosed. The speech-directed user interface system includes at least one speaker for delivering an audio signal to a user and at least one microphone for capturing speech utterances of a user. An interface device interfaces with the speaker and the microphone and provides a plurality of audio signals to the speaker to be heard by the user. A control circuit is operably coupled with the interface device and is configured for selecting at least one of the plurality of audio signals as a foreground audio signal for delivery to the user through the speaker. The control circuit is operable for recognizing speech utterances of a user and using the recognized speech utterances to control the selection of the foreground audio signal.

United States Patent Application Publication No. US 2002/0087310 A1 discloses a computer-implemented method and system for handling a speech dialogue with a user. Speech input from a user contains words directed to a plurality of concepts. The user speech input contains a request for a service to be performed. Speech recognition of the user speech input is used to generate recognized words. A dialogue template is applied to the recognized words. The dialogue template has nodes that are associated with predetermined concepts. The nodes include different request processing information. Conceptual regions are identified within the dialogue template based upon which nodes are associated with concepts that approximately match the concepts of the recognized words. The user's request is processed by using the request processing information of the nodes contained within the identified conceptual regions.

The article "Transient Detection of Audio Signals Based on an Adaptive Comb Filter in the Frequency Domain", M. Kwong and R. Lefebvre presents a transient detection algorithm suitable for rhythm detection in music signals. In many audio signals, low energy transients are masked by high energy stationary sounds. These masked transients, as well as higher energy and more visible transients, convey important information on the rhythm and time segmentation of the music signal. The proposed segmentation algorithm uses a sinusoidal model combined with adaptive comb filtering in the frequency domain to remove the stationary component of a sound signal. After filtering, the time envelope of the residual signal is analyzed to locate the transient components. Results show that the proposed algorithm can accurately detect most low energy transients.

The mixing of a multi-track recording typically is an authoring task which is usually done by an expert, the mixing engineer. Current developments in multimedia like interactive audio formats lead to applications where multi-track recordings need to be mixed in an automated way or in a semi-automated way guided by a non-expert. It is desired that the automatically derived mixture signal has comparable subjective sound quality to a mixture signal generated by a human expert.

The teachings disclosed herein address this general goal. The teachings are related to audio signal processing, in particular the task of mixing a multi-track according to a set of user-defined recording criteria for the (eventual) purpose of listening. An audio mixer and a method for mixing a plurality of audio tracks to a mixture signal according to the teachings disclosed herein establish a connection between a substantially aesthetic idea of a non-expert and the resulting mixture signal.

SUMMARY

According to an embodiment, an audio mixer for mixing a plurality of audio tracks to a mixture signal may have: a semantic command interpreter for receiving a semantic mixing command and for deriving a plurality of mixing parameters for the plurality of audio tracks from the semantic mixing command, wherein the plurality of mixing parameters are a function of spectral and temporal characteristics of the plurality of audio tracks; an audio track processor for processing the plurality of audio tracks in accordance with the plurality of mixing parameters; and an audio track combiner for combining the plurality of audio tracks processed by the audio track processor into the mixture signal.

According to another embodiment, a method for mixing a plurality of audio tracks to a mixture signal may have the steps of: receiving a semantic mixing command; deriving a plurality of mixing parameters for the plurality of audio tracks from the semantic mixing command, wherein the plurality of mixing parameters are also a function of spectral and temporal characteristics of the plurality of audio tracks; processing the plurality of audio tracks in accordance with the plurality of mixing parameters; and combining the plurality of audio tracks resulting from the processing of the plurality of audio tracks to form the mixture signal.

According to another embodiment, an audio mixer for mixing a plurality of audio tracks to a mixture signal may have: a semantic command interpreter for receiving a semantic mixing command and for deriving a plurality of mixing parameters for the plurality of audio tracks from the semantic mixing command; an audio track processor for processing the plurality of audio tracks in accordance with the plurality of mixing parameters; and an audio track combiner for combining the plurality of audio tracks processed by the audio track processor into the mixture signal; and an audio track identifier for identifying a target audio track among the plurality of audio tracks, the target audio track being indicated within the semantic mixing command by an audio track identification expression, the audio track identifier being configured to retrieve a data record that corresponds to the audio track identification expression from an audio track template database, the data record having information about a corresponding musical instrument in the form of at least one of a measurement value and a sound sample, to analyze the audio tracks, and to compare audio signals of the audio tracks with the data record, in order to determine one audio track or several audio tracks that appear to match the target audio track.

According to another embodiment, a method for mixing a plurality of audio tracks to a mixture signal may have the steps of: receiving a semantic mixing command; deriving a plurality of mixing parameters for the plurality of audio tracks from the semantic mixing command, the plurality of mixing parameters having a mixing parameter for a target audio track; identifying a target audio track being indicated within the semantic mixing command by an audio track identification expression; retrieving, from an audio track template database, a data record that corresponds to the audio track identification expression, the data record having information about a corresponding musical instrument in the form of at least one of a measurement value and a sound sample; identifying the target audio track among the plurality of audio tracks by analyzing audio signals of the audio tracks and comparing them with the data record, to determine one audio track or several audio tracks that appear to match the target audio track; processing the plurality of audio tracks in accordance with the plurality of mixing parameters; and combining the plurality of audio tracks resulting from the processing of the plurality of audio tracks to form the mixture signal.

Another embodiment may have a computer program for instructing a computer to perform the above methods for mixing a plurality of audio tracks to a mixture signal.

According to the teachings disclosed herein, an audio mixer for mixing a plurality of audio tracks to a mixture signal comprises a semantic command interpreter, an audio track processor, and an audio track combiner. The semantic command interpreter is configured for receiving a semantic mixing command and for deriving a plurality of mixing parameters for the plurality of audio tracks from the semantic mixing command. The audio track processor is configured for processing the plurality of audio tracks in accordance with the plurality of mixing parameters. The audio track combiner is configured for combining the plurality of audio tracks processed by the audio track processor into the mixture signal.

The method for mixing a plurality of audio tracks to a mixture signal according to the disclosed teachings comprises: receiving a semantic mixing command; deriving a plurality of mixing parameters for the plurality of audio tracks from the semantic mixing command; processing the plurality of audio tracks in accordance with the plurality of mixing parameters; and combining the plurality of audio tracks resulting from the processing of the plurality of audio tracks to form the mixture signal.

The computer program comprises or represents instructions for enabling a computer or a processor to perform the method for mixing a plurality of audio tracks. The computer program may be embodied on a computer readable medium having stored thereon said computer program for performing, when running on a computer, the above methods.

The semantic mixing command may be based on user-defined criteria which provide a semantic description of the desired resulting mixture signal. According to the teachings disclosed herein, semantic audio analysis, psychoacoustics, and audio signal processing may be incorporated with each other in order to derive a mixture signal automatically on the basis of the semantic descriptions. This process may be termed "Semantic Mixing".

Semantic Mixing may be regarded as a method which enables a computer to mix a multi-track recording according to a specification given by a user. The specification is typically given in the form of a semantic description. Given this semantic description, the mixing parameters may be determined by taking into account the characteristics of the single track(s) and the human hearing.

The audio mixer according to the teachings disclosed herein thus typically comprises a computer or processor, or it interacts with a computer/processor. The audio track processor and the audio track combiner may be combined as a single unit.

The deriving of the plurality of mixing parameters from the semantic mixing command may involve analyzing a meaning of the semantic mixing command, or of parts thereof. A part of the semantic mixing command may be a semantic expression, such as a word or a group of words. The semantic expression(s) may then be translated to a set of specific mixing parameters for the plurality of audio tracks. Thus, the semantic mixing command is implemented by means of the specific mixing parameters that correspond to the meaning of the semantic mixing command. The action of translating the semantic mixing command and/or of its constituting semantic expressions may comprise evaluating a translation function or querying a lookup table, for example. Parameters of the translation function or data records in the lookup table are typically pre-defined and represent a collection of expert knowledge of e.g. experienced mixing engineers. The expert knowledge may be gathered over time e.g. by logging the oral instructions given by an artist or a music producer to his/her mixing engineer, as well as the settings performed by the mixing engineer. Thus, the translation function and/or the lookup table may be trained by an expert mixing engineer.

According to an aspect of the teachings disclosed herein, the semantic command interpreter may comprise a vocabulary database for identifying semantic expressions within the semantic mixing command. By means of the vocabulary database, the semantic command interpreter may identify for example synonyms. It may further be possible to map a word or a group of words contained in the semantic mixing command to a specific value. For example, a word for identifying an instrument ("guitar") may be mapped to a particular channel number or identifier, on which the instrument has been recorded. The vocabulary database may further comprise entries identifying a certain part of a musical part, such as the beginning (e.g. "Intro"), the chorus ("Chorus"), or the end (e.g. "Coda" or "Outro"). Yet another possible use of the vocabulary database is for recognizing and assigning semantically expressed mixing parameters or styles, such as "loud", "soft", "clear", "muffled", "distant", "close" etc.

In an embodiment of the teachings disclosed herein, the audio mixer may further comprise an audio track identifier for identifying a target audio track among the plurality of audio tracks. The target audio track may be indicated within the semantic mixing command by an audio track identification expression. The audio track identifier may be useful if the plurality of audio tracks are not clearly marked or identified as to which part or stem they contain. For example, the audio tracks may be simply numbered as "track 1", "track 2", . . . "track N". The audio track identifier may then analyze each one of the plurality of audio tracks to determine either none, one, or several audio tracks that appear to match an audio track identified by the track identification expression.

The audio track identifier may be configured to retrieve a data record that corresponds to the audio track identification expression from an audio track template database, to perform an analysis of at least one of a track name, a track identifier, a timbre, a rhythmic structure, a frequency range, a sound sample, and a harmonic density of at least one audio track among the plurality of audio tracks, to compare a result of the analysis with the data record resulting in at least one matching score, and to determine the target audio track on the basis of the at least one matching score between the at least one audio track and the data record. The task to be performed by the audio track identifier is to identify the target audio track among the plurality of audio tracks. The target audio track corresponds to the audio track identification expression, that is, if the audio track identification expression is "guitar", then, subsequent to successful identification by the audio track identifier, the target audio track should typically contain the guitar part of a musical work. The audio track template database may comprise a data record corresponding to the instrument "guitar", the data record itself comprising values and/or information that are characteristic for a guitar. For example, the data record may comprise a frequency model of the typical guitar sound and/or an attack-decay model of the typical guitar sound. The data record could also contain a sound sample of a guitar, which may be used for a similarity analysis by the audio track identifier.

According to an aspect of the teachings disclosed herein, the audio mixer may further comprise a time section identifier for identifying a target time section within the plurality of audio tracks, the target time section being indicated within the semantic mixing command by a time section identification expression. In case the user wishes to mix a first section of an audio signal (e.g. a musical work) differently from a second section of the same audio signal, the audio mixer typically needs to know, where the various sections of the audio signal begin and end in order to apply specific mixing parameters to these sections of the audio signal.

The time section identifier may be configured to structure the plurality of audio tracks into a plurality of time sections. Especially musical works often have a certain structure influenced by musical conventions, e.g. the song form with its alternating verse and chorus sections. This knowledge may be exploited by the time section identifier by first determining whether the audio signal represented by the plurality of audio tracks follows a certain musical structure and then to assign the time sections of the audio signal to the time sections of the musical structure. To this end, the time section identifier may comprise a pattern recognizer to recognize recurring and/or similar patterns within the audio signal. Pattern recognition may be based on melody analysis, harmonic analysis, and rhythmic analysis, to name a few.

The time section identifier may be configured to perform an analysis of the plurality of audio tracks for determining at least one time instant at which a change of a characteristic property of an audio signal represented by the plurality of audio tracks occurs, and for using the at least one determined time instant as at least one boundary between two adjacent time sections.

The audio mixer may further comprise a meta-data interface for receiving meta-data relative to the plurality of audio tracks, the meta-data being indicative of at least one of a track name, a track identifier, a time structure information, an intensity information, spatial attributes of an audio track or a part thereof, timbre characteristics, and rhythmic characteristics. The meta-data may have been generated by the producer of the plurality of audio tracks and provide useful information for the audio mixer or the method for mixing the plurality of audio tracks. The availability of meta-data saves the audio mixer or the method from having to perform an extensive analysis of the audio signal in order to identify the various audio tracks and/or time sections. The meta-data interface may also be used for storing the results (instruments, time structure, . . . ) of an analysis for future reuse. Thus, a potentially lengthy analysis of the plurality of audio tracks needs to be performed only once. Furthermore, any manual corrections to the automatically determined analysis results may also be stored so that the user does not have to correct the same issues over and over again. Having the stored analysis results at hand, the user may produce different mix versions from the same plurality of audio tracks using the same meta-data.

According to an aspect of the teachings disclosed herein, the audio mixer may further comprise a command interface for receiving the semantic mixing command in a linguistic format. The linguistic format allows the user to express his/her desires regarding the result of the mixing performed by the audio mixer substantially by means of normal language. The semantic mixing command in the linguistic format may be input to the audio mixer as spoken language using a microphone or written language using e.g. a keyboard.

According to another aspect of the teachings disclosed herein, the audio mixer may further comprise an example interface for receiving an exemplary mixture signal, and a mixture signal analyzer for analyzing the exemplary mixture signal and for generating the semantic mixing command based on the analyzing of the exemplary mixture signal. Using the exemplary mixture signal provided via the example interface, the mixture signal analyzer may determine which features characterize the exemplary mixture signal. For example, the mixture signal analyzer may recognize an emphasis on the (strongly repetitive) drum part and the bass part, while the melody is less accentuated. These detected features suggest a so called Dance-Mix, i.e. a certain style of mixing. This information may be provided from the mixture signal analyzer to the semantic command interpreter. Based on this information, the semantic command interpreter may, for example increase the volume of the drum part and the bass part relative to the other parts. The semantic command interpreter might even replace the drum part with, for example, a synthesized drum part typically used for the desired Dance-Mix style.

The example interface may be further configured to receive a plurality of example audio tracks from which the exemplary mixture signal was obtained. The mixture signal analyzer may be configured to compare the example audio tracks with the exemplary mixture signal in order to determine the mixing parameters that were used to obtain the resulting exemplary mixture signal. The semantic mixing command produced by the mixture signal analyzer could then comprise a description of how the example audio tracks were modified before they were mixed together to form the exemplary mixture signal. For example, the semantic mixing command may comprise an expression such as "drums significantly louder; vocals moderately softer, more distant, filtered with high pass filter". The semantic command interpreter may then derive the plurality of mixing parameters from this semantic mixing command.

According to another aspect of the teachings disclosed herein, the semantic command interpreter may comprise a perceptual processor for transforming the semantic mixing command into the plurality of mixing parameters according to a perceptual model of hearing-related properties of the mixture signal. The perceptual model typically implements psychoacoustic rules that describe how certain mixing parameters should be chosen in order to achieve a desired effect for the listener. For example, for conveying an impression of distance, several sound processing actions may be involved, such as reverberation, frequency filtering, and attenuation. The perceptual model which is typically based on psychoacoustic findings facilitates the determination of suitable mixing parameters for the realization of a desired effect.

According to another aspect of the teachings disclosed herein, the semantic command interpreter comprises a fuzzy logic processor for receiving at least one fuzzy rule derived from the semantic mixing command by the semantic command interpreter, and for generating the plurality of mixing parameters on the basis of the at least one fuzzy rule. The fuzzy logic processor is well suited for processing the semantic mixing command in the form of the at least one fuzzy rule. The at least one fuzzy rule maps an input quantity of the fuzzy logic processor to an output quantity of the fuzzy logic processor in a substantially semantic domain, i.e. a mapping from a quantity of a first semantic format to a quantity of a second semantic format.

The fuzzy logic processor may be configured to receive at least two concurring fuzzy rules prepared by the semantic command interpreter, and wherein the audio mixer further comprises a random selector for selecting one concurring fuzzy rule among the at least two concurring fuzzy rules. By randomizing the selection of the fuzzy rule from two or more concurring fuzzy rules, an illusion of artistic freedom can be created so that the mixture signals produced by the audio mixer do not tend to sound substantially alike, as far as the mixing style is concerned, which could otherwise be the case when the audio mixer follows a more rigid scheme with respect to the fuzzy rules.

In terms of the method for mixing the plurality of audio tracks, a vocabulary database for identifying semantic expressions within the semantic mixing command may be queried.

The method may further or alternatively comprise an identification of a target audio track among the plurality of audio tracks, the target audio track being indicated within the semantic mixing command by an audio track identification expression. To this end, a data record that corresponds to the audio track identification expression from an audio track template database may be retrieved. Then, an analysis of at least one of a track name, a track identifier, a timbre, a rhythmic structure, a frequency range, a sound sample, and a harmonic density of at least one audio track among the plurality of audio tracks may be performed. A result of the analysis may be compared with the data record resulting in at least one matching score. Then, the target audio track may be determined on the basis of the at least one matching score between the at least one audio track and the data record.

The method may also comprise an action for identifying a target time section within the plurality of audio tracks, the target time section being indicated within the semantic mixing command by a time section identification expression. The action for identifying the target time section may be configured to structure the plurality of audio tracks into a plurality of time sections. The time section identification may comprise performing an analysis of the plurality of audio tracks for determining at least one time instant at which a change of a characteristic property of an audio signal represented by the plurality of audio tracks occurs, and using the at least one determined time instant as at least one boundary between two adjacent time sections.

According to another aspect of the teachings disclosed herein, the method may further comprise receiving meta-data relative to the plurality of audio tracks at a meta-data interface. The meta-data may be indicative of at least one of a track name, a track identifier, a time structure information, an intensity information, spatial attributes of an audio track or a part thereof, timbre characteristics, and rhythmic characteristics.

The method may further comprise receiving the semantic mixing command in a linguistic format at a command interface of a corresponding audio mixer.

According to another aspect of the teachings disclosed herein, the method may further comprise: receiving an exemplary mixture signal at an example interface, analyzing the exemplary mixture signal by means of a mixture signal analyzer, and generating the semantic mixing command based on the analyzing of the exemplary mixture signal.

The action of deriving the plurality of mixing parameters from the semantic mixing command may comprise: transforming the semantic mixing command into the plurality of mixing parameters according to a perceptual model of hearing-related properties of the mixture signal.

According to an aspect of the teachings disclosed herein, the action of deriving the plurality of mixing parameters may comprise: receiving at least one fuzzy rule derived from the semantic mixing command by a semantic command interpreter, and generating the plurality of mixing parameters on the basis of the at least one fuzzy rule. The reception of the at least one fuzzy rule and the generation of the plurality of mixing parameters on the basis of the at least one fuzzy rule may be performed by a fuzzy logic processor.

The method may further comprise: receiving at least two concurring fuzzy rules, and randomly selecting one concurring fuzzy rule among the at least two concurring fuzzy rules.

The teachings disclosed herein are different from the above mentioned known technology in the following points:

The method proposed by Perez-Gonzalez et al. does not take semantic descriptions into account to control the processing.

The Semantic HiFi project does not address the processing of multi-track formats. It does not address mixing of signals according to semantic descriptions. It does not address the perceptual aspects which are needed to compute a mixture signal which fulfils the semantic descriptions.

The "Structured Audio" project is related to synthesizing audio signals. In contrast, the teachings disclosed herein (Semantic Mixing) is related to mixing audio signals.

To briefly summarize some of the core aspects of the teachings disclosed herein, the mixing of a multi-track recording is an authoring task. Semantic Mixing aims at developing solutions for mixing a multi-track recording guided by semantic descriptions. It combines techniques of semantic audio analysis, psychoacoustics and audio signal processing. Semantic mixing is applicable to various applications like music production, SAOC (Spatial Object Audio Coding), home video authoring, virtual reality, and games. Semantic Mixing can be described in short with the following (partially optional) features:

It provides means for user interaction

Semantic Mixing addresses the perceptual component to a large extent. This may include also the adaptation to the environment, the playback system, and user preferences.

It combines the semantic part and the psychoacoustic part. Any semantic processing needs to take perceptual aspects into account. It focuses on audio signal processing rather than on traditional applications of semantic analysis (music information retrieval, playlist generation). It aims at new ways of interaction with the content.

It is related to the processing of multi-track recordings

The teachings disclosed herein relate, inter alia, to a method for the mixing of multi-track signals according to user specifications. It is related to audio signal processing, in particular to the task of mixing a multi-track recording according to a set of user-defined criteria. The user-defined criteria provide a semantic description of the resulting mixture signal. The teachings disclosed herein may incorporate audio analysis, psychoacoustics, and audio signal processing in order to derive a mixture signal automatically on basis of the semantic description.

BRIEF DESCRIPTION OF THE DRAWINGS

The above features and other features of the teachings disclosed herein will be apparent from the following description, which is made by way of example only with reference to the accompanying schematic drawings in which.

DETAILED DESCRIPTION OF THE INVENTION

Figure 1:
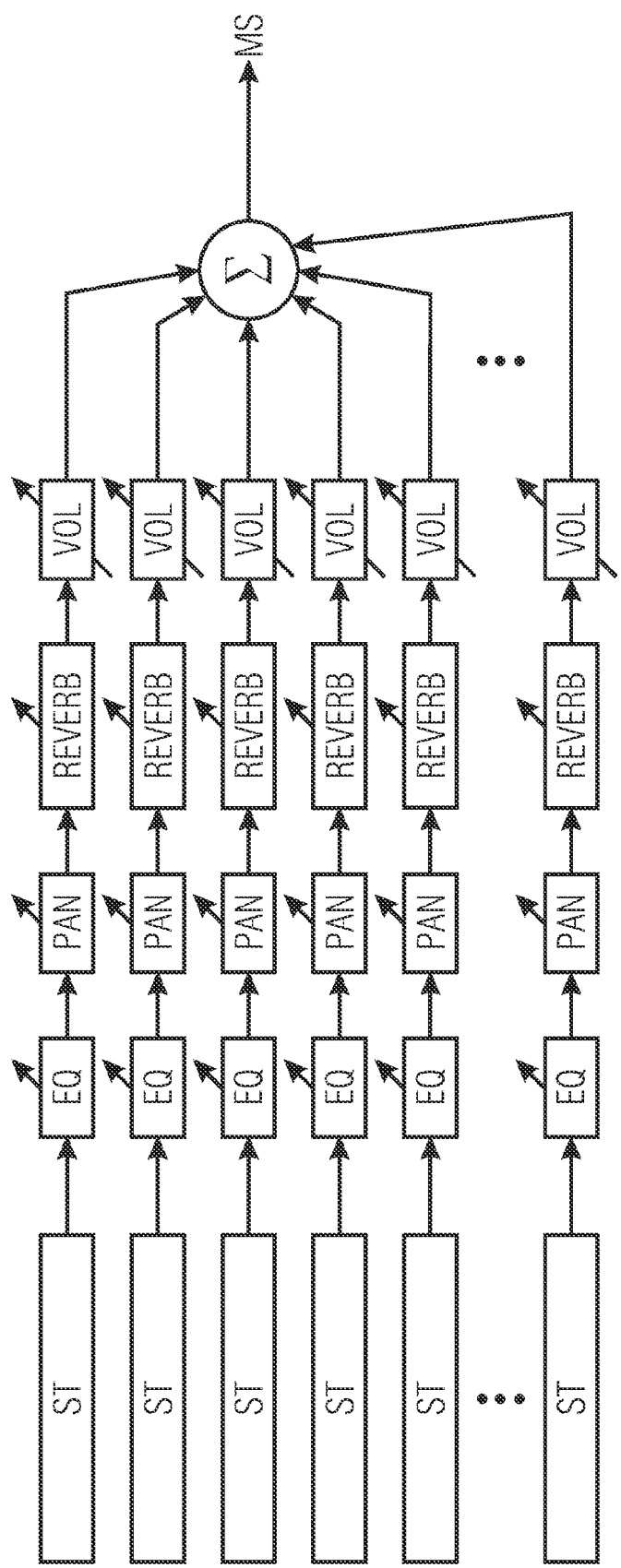
FIG. 1 shows a schematic block diagram of an audio mixer.

FIG. 1 shows a schematic block diagram of an audio mixer. The audio mixer allows to combine a plurality of single tracks ST so that a mixture signal MS is formed. In order to control the combining of the single tracks ST, each single track is typically fed to an individual signal processor. The individual signal processor for one single track may comprise for example an equalizer EQ, a panning control PAN, a reverberator REVERB, a volume control VOL, and possibly further sound effects. A central role of the audio mixer is to adjust the volume of each one of the plurality of single audio tracks ST so that the mixture signal is a well balanced superposition of the audio signals provided by the plurality of single tracks ST. The decision of which particular setting of the sound effects and volumes of the single tracks ST constitutes a well balanced superposition is typically made by a mixing engineer. The plurality of individual signal processors modifies the plurality of audio track signals. The modified audio track signals are then combined in a signal combiner E to produce the mixture signal MS.

Figure 2:
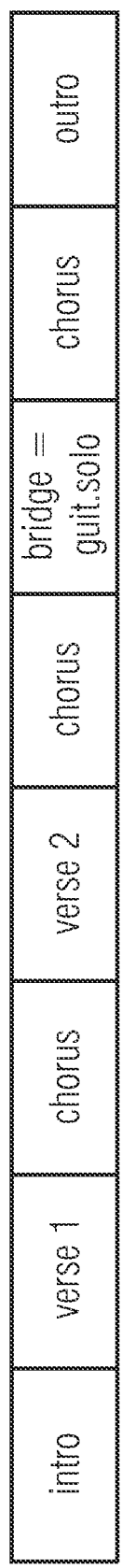
FIG. 2 illustrates an exemplary time structure of a musical work in the song structure often employed in popular music.

FIG. 2 illustrates a time structure of a typical song belonging to the popular music genre. The song used as an example within FIG. 2 starts with an introduction (INTRO), followed by a verse section (VERSE 1), a chorus (CHORUS), a second verse (VERSE 2) section with substantially the same music but different lyrics, a repetition of the chorus, a bridge (BRIDGE), another repetition of the chorus, and a coda or outro (OUTRO). While a multitude of variations of this basic scheme exist, it is usually possible to distinguish the various sections of a popular music song for most people. For example, the chorus is typically repeated at various locations throughout the song with substantially the same lyrics and melody, so that is can be easily recognized by a listener.

Figure 3:
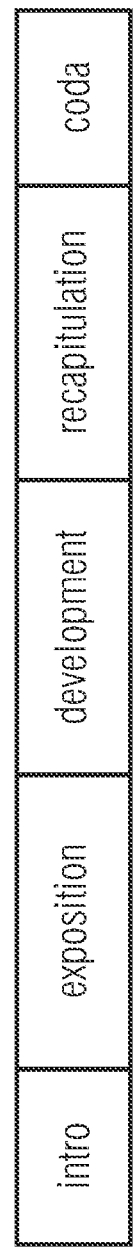
FIG. 3 illustrates another exemplar time structure of a musical work in sonata form known in classical music.

FIG. 3 illustrates a time structure of a musical work composed in the sonata form. The sonata form has been used by a large number of composers of classical music. As the name suggests, the sonata form is widely used in sonatas, typically the first movement thereof. The first movement of many symphonies typically is in the sonata form, as well. Characteristic sections of the sonata form are the exposition, the development, and the recapitulation, in which basically the same musical material is presented with various modifications, in particular with respect to the chord progression. Optionally, an introduction and a coda may be presented at the beginning and the end of the musical work, respectively. While it may take some experience to distinguish the various time sections of the sonata form, it is in general feasible for a human listener.

A mixing engineer might want to treat different time sections of a musical work in different ways. The reason may be the desire to achieve a certain artistic effect, or to make the mixture signal MS sound more uniformly by compensating for potential imperfections that may have occurred during the recording of the plurality of audio tracks. Knowledge about the time structure of the musical work or a general audio recording (e.g. audio book, lecture, etc.) can assist the mixing engineer in finding the starting points and end points of the various time sections in the recording.

Figure 4:
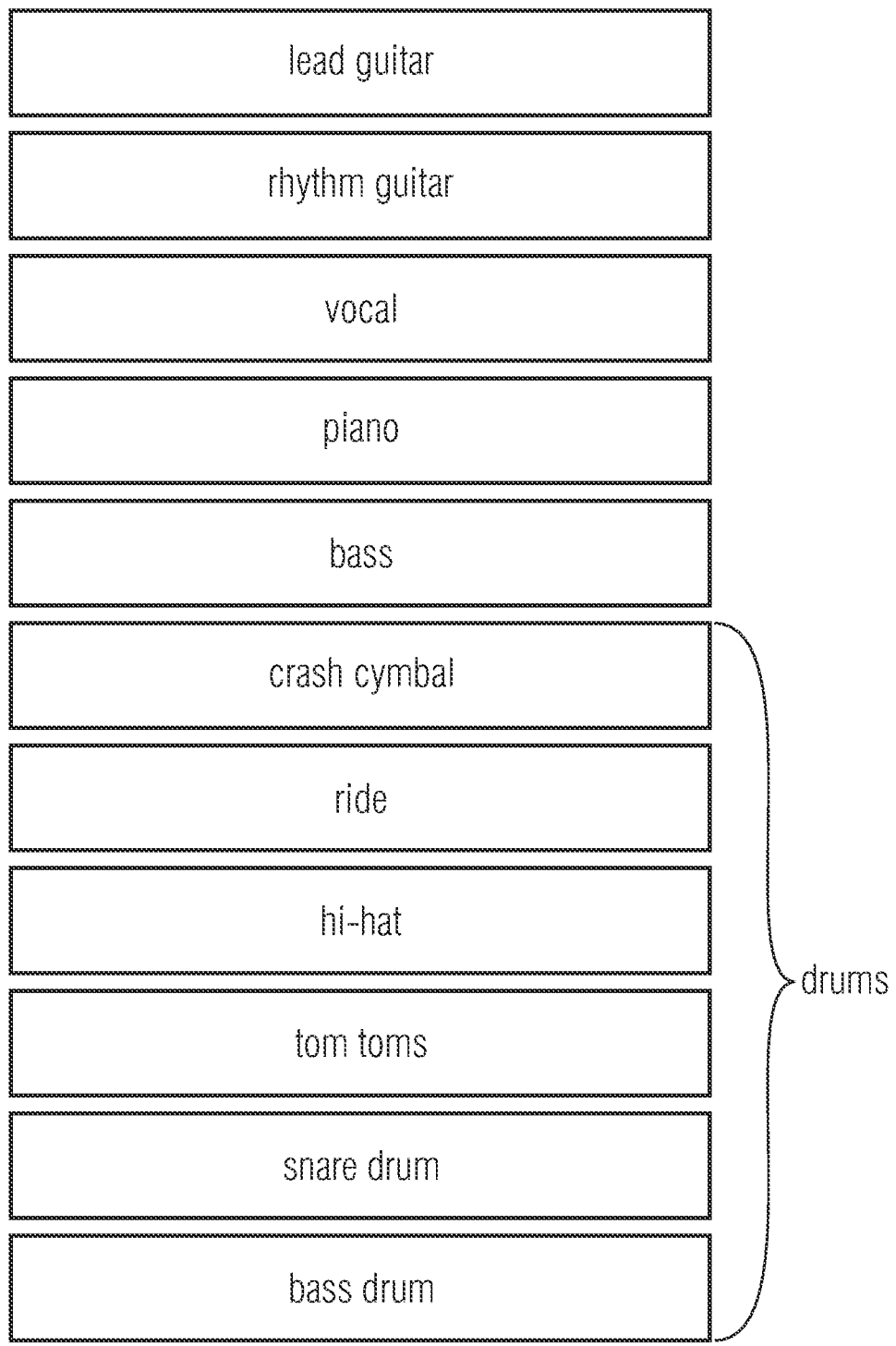
FIG. 4 illustrates an exemplary audio track layout of a popular music recording.

FIG. 4 illustrates an exemplary audio track layout of a recording of a song in the popular music genre. Single audio tracks ST exist for the following instruments: lead guitar, rhythm guitar, vocal part, piano, and bass. A drum set has been recorded using several single audio tracks for the various parts of the drum set: crash cymbal, ride cymbal, hi-hat, tom-toms, snare drum, and bass drum. The use of several audio tracks ST for the different parts of the drum set allows the mixing engineer to better balance the drum part than when only a single audio track would have been used for the entire drum set.

With the plurality of single audio tracks at hand, the musical work can be mastered as desired by the performing artist and/or the mixing engineer. In particular, the character or "mood" of a musical work may be altered in a significant manner by changing the mixing parameters that are used for the plurality of audio tracks ST. Providing the plurality of audio tracks ST for a consumer for mixing offers the consumer a large degree of freedom. However, many users lack the experience to appropriately select the mixing parameters, in particular because of complicated interconnections and interactions between the mixing parameters. In order to achieve a certain effect which appears to affect a single audio track, the mixing parameters of several or even all audio tracks might have to be adjusted.

Figure 5:
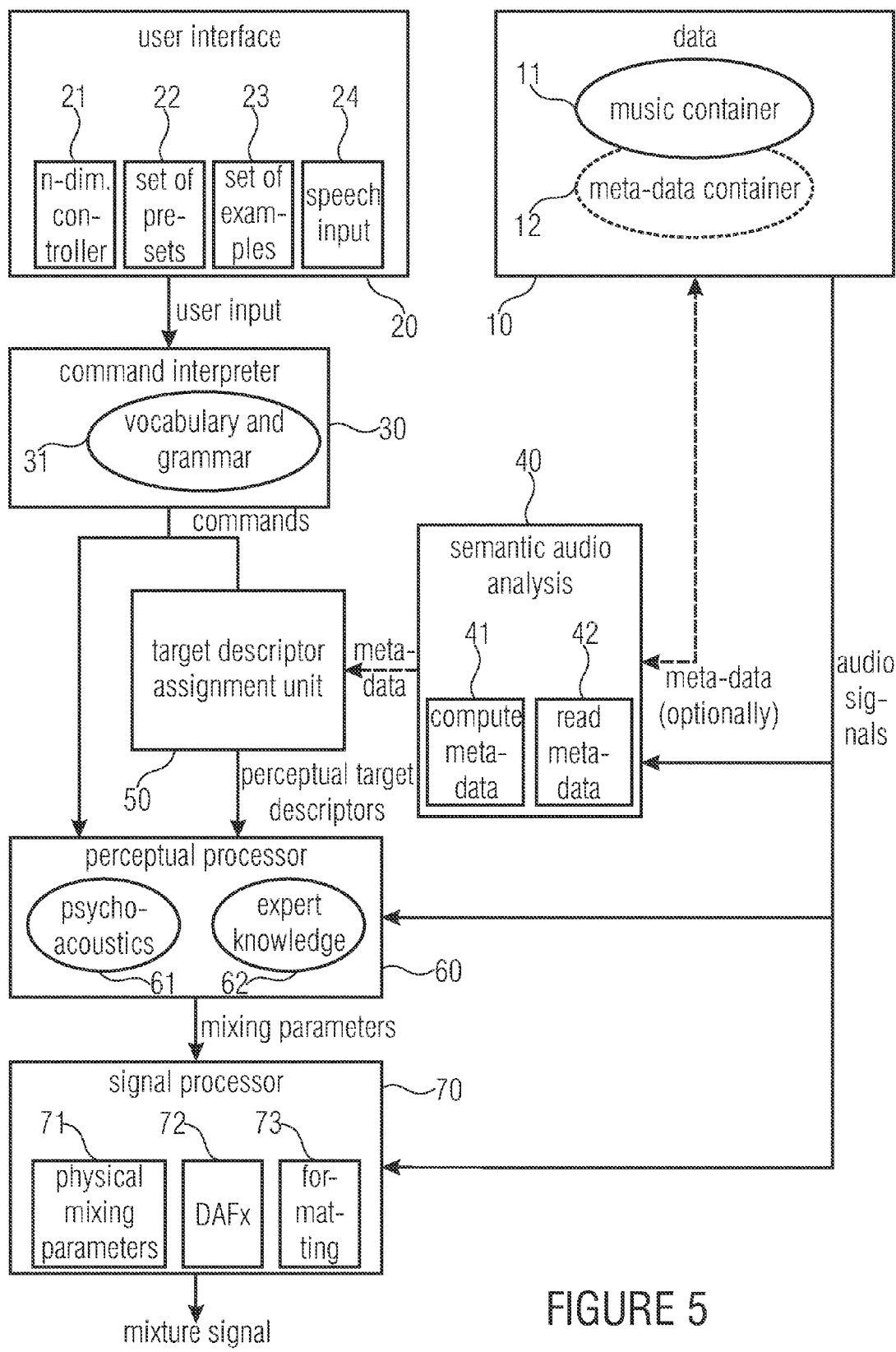
FIG. 5 shows a schematic block diagram of an audio mixer according to the teachings disclosed herein.

FIG. 5 shows a schematic block diagram of an audio mixer according to the teachings disclosed herein having a first possible configuration.

Typically, the user (or listener) has a certain idea of how the mixture signal should sound, but does not know how the mixing parameters should be adjusted to achieve this idea.

The audio mixer according to the teachings disclosed herein establishes a link between a semantic expression that describes the user's idea or desire in a concise form, and the actual mixing parameters needed to mix the plurality of single audio tracks ST into the mixtures signal MS.

A simple, yet illustrative example for a semantic description guiding a mixing process is the following: "During the guitar solo, mix the guitar prominently and move the keyboards slightly into the background".

To accomplish this, at least some of the various sub-tasks listed below typically need to be addressed:

The semantic descriptions given by the user need to be captured using an appropriate user interface.

The user input needs to be translated into a machine-readable form.

A semantic analysis of the musical audio signal needs to be performed (e.g. identifying the guitar track and the keyboard track, finding the beginning and the end of the guitar solo).

The physical mixing parameters need to be determined by taking the human hearing mechanism into account (e.g. determining the gain such that the perceived loudness of the guitar in the mix is louder than any other instrument, but not too loud; for the keyboards, determining the gain, delay, and the gain of the send track to the reverb effect for the desired perception of distance).

The mix is derived using the computed physical mixing parameters. The parameters comprise gain factors and time delays for each combination of a single audio track ST and output channel. Furthermore, the physical mixing parameters control digital audio effect processors (DAFx), e.g. artificial reverberation and dynamic range processing.

Semantic descriptions may for example specify perceived position and loudness of each sound object SO in the mixture signal MS parameters of the DAFx for each track characteristics for the mixture signal MS (e.g. the amount of reverberation, the dynamic range).

In the schematic block diagram of FIG. 5 showing a possible configuration of an audio mixer according to the teachings disclosed herein, the above mentioned sub-tasks are accomplishes by modules of the audio mixer. The audio mixer comprises a user interface (UI) 20, a command interpreter (CI) 30, a semantic audio analysis (SAA) 40, a target descriptor assignment unit (DAU) 50, a perceptual processor 60, and a signal processor 70.

The user interface 20 provides facilities for capturing an input from a user of the audio mixer. Different options for the implementation of the user input exist, as illustrated by a plurality of sub-modules that are part of the user interface 20. Examples are:

the selection of one of a set of presets (sub-module 22);

a set of n-dimensional controllers which are assigned to different characteristics of the single tracks and the resulting mixture signal MS (sub-module 21);

natural language input (sub-module 24);

input of an example of a mixture signal MS or an example of a multi-track together with a corresponding mixture signal MS (sub-module 23). The given example will then be analysed to derive the semantic description for the mixture signal MS. A mode of operation of the audio mixer that is controlled by this sort of user input will be referred to as "mixing by example" in the subsequent description.

The command interpreter 30 is connected to the user interface 20 and translates the input (which is human readable or given by examples) into machine readable commands. These commands typically have restricted vocabulary and known grammar which is provided and/or controlled by a vocabulary grammar sub-module 31.

Examples for the implementation of the command interpreter 30 are given in Table 1 for different user interface designs.

| Input | Implementation of the command interpreter 30 |
|---|---|
| Presets | Selecting a set of rules using a table look-up |
| N-dimensional controller | Mapping function of controller inputs to commands |
| Mixing by example | Analysis of audio signals |
| Natural language | Speech recognition and understanding |

Besides the user input, the audio mixer also receives data 10 comprising the single audio tracks ST as an input. In case the data 10 corresponds to audio tracks of a musical work, the data 10 may comprise a music container 11 and an optional meta-data container 12. The data 10 may be provided to the audio mixer via a suitable interface (not shown in FIG. 5).

The data 10 is fed to the Semantic Audio Analysis (SAA) 40. The semantic audio analysis 40 typically is an automated process which computes a set of meta-data for each of the audio tracks ST. Furthermore, meta-data describing the multi-track, i.e. the plurality of audio tracks, may be computed (e.g. musical genre). The meta-data are semantic descriptors which characterize the audio signals.

The semantic audio analysis 40 can comprise:

instrument identification structural analysis (labelling of verse, chorus, and other parts of each signal)

identification of playing style (solo, accompaniment, melodic, harmonic, and rhythmic entropy)

rhythmic analysis (e.g. beat tracking for beat synchronous sound effects)

melodic and harmonic analysis characterization of the timbre (e.g. brightness, roughness, sharpness)

characterization of the similarities (with respect to timbre, playing style, form) among the single audio tracks ST musical genre These meta-data may be used to assign the appropriate signal processing, via the mixing parameters, to each of the single tracks ST.

The semantic audio analysis can be performed every time the process of Semantic Mixing is performed. Optionally, the semantic audio analysis can be performed once (during production/authoring) and the resulting meta-data can be stored and transmitted together with the multimedia item.

Optionally, the semantic audio analysis 40 can be guided by user inputs, i.e. the user can assist the semantic audio analysis 40 or he/she can input meta-data if he/she is not satisfied with one or more of the automatically derived results of the semantic audio analysis. These correctional user input may be stored by the semantic audio analysis to be taken into account during future analyses so that the semantic audio analysis 40 may adapt to the user's preferences, i.e. the semantic audio analysis 40 is trained over time by means of the user inputs.

The semantic audio analysis 40 may comprise a first sub-module 41 for computing the meta-data on the basis of the audio signals contained in the plurality of audio tracks ST. Additionally or alternatively, the semantic audio analysis 40 may comprise a second sub-module 42 for reading meta-data that is provided along with the plurality of audio tracks ST.

Connected to the command interpreter 30 and the semantic audio analysis 40 is the target descriptor assignment unit (DAU) 50. Given the commands form the command interpreter 30 and the meta-data obtained from the semantic audio analysis 40, the target descriptor assignment unit 50 selects parts of the audio signal (it determines the tracks and starting times and stop times which correspond to sound objects for which commands exist) and assigns appropriate perceptual target descriptors (PTD) to them.

The perceptual target descriptor can describe:
- the perceived intensity of a sound object (loudness)
- spatial attributes of a sound object (lateral angle, height, distance, diffuseness, width)
- timbral characteristis (e.g. brightness, sharpness, roughness) for a sound object
- characteristics related to digital audio effects (DAFx)

If the commands are given using linguistic variables, the target descriptor assignment unit 50 can use fuzzy logic for the conversion between linguistic variables into crisp values.

An output of the target descriptor assignment unit 50 providing the perceptual target descriptor is connected to an input of the perceptual processor (PP) 60. The perceptual processor 60 computes the physical parameters (mixing parameters) for mixing and additional signal processing (e.g. DAFx) given the assigned perceptual target descriptor. This typically is a highly demanding task which needs to take into account psychoacoustics 61 and expert knowledge 62.

This is illustrated with the following example: For a particular audio signal, e.g. a guitar track, the descriptor for the perceived level is set to "high". A simple solution is to increase the gain of the guitar by a fixed amount, e.g. 6 dB. This simple solution may not have the desired effect in all cases, since the perception of loudness depends on spectral and temporal characteristics of the processed audio signal and of the mixture signal MS in a highly complex way.

Better results may be obtained by setting all levels such that the loudness of the guitar, which is perceived by the listener, in the mix is adjusted, e.g. by using a perceptual model of loudness and partial loudness. Partial loudness is the loudness of a signal of presented in a sound mixture, where the signal of interest is partially masked.

Different aspects of human hearing and the perception of sound typically need to be addressed in addition to the perception of loudness. These are the perception of the amount of reverberation, sound localization, and the perception of spatial attributes.

The psychoacoustics part is important to translate the semantic description (e.g. "make this slightly louder") into a physical parameter (e.g. "boosting by 4.5 dB").

The perceptual processor 60 is connected via one of its outputs to an input of the signal processor (SP) 70. The signal processor 70 may comprise a module handling the physical mixing parameters 71, one or more digital audio effects 72, and a module for formatting 73. With the physical parameters for mixing and signal processing, the signal processor 70 computes the mixture signal MS.

In the Convention Paper "Automatic Music Production System Employing Probabilistic Expert Systems", Audio Engineering Society, presented at the 129$^{th}$ Convention, 2010 Nov. 4-7, the authors R. Gang et al. propose to employ a probabilistic graphical model to embed professional audio engineering knowledge and infer automatic production decisions based on musical information extracted from audio files. The production pattern, which is represented as probabilistic graphical model, can be learned from the operation data of a human audio engineer or manually constructed from domain knowledge. The perceptual processor 60 and/or the semantic command interpreter 30 may implement the technical features proposed in this Convention Paper. The entire content of the foregoing Convention Paper is incorporated herein by reference.

Mixing a multi-track recording comprises:
- Adjustment of levels and panning positions for each single track (module for handling physical mixing parameters 71)
- Equalization (for single tracks ST and the mixture signal MS)
- Dynamic Range Processing (DRP) (for single tracks ST and the mixture signal MS)
- Artificial Reverberation
- Applying sound effects (DAFx 72)

Each of these operations is controlled by the physical parameters as computed by the perceptual processor 60.

Formatting 73 is optionally necessitated to take care of physical constraints (e.g. applying an automated gain control) and format conversion (audio coding/decoding).

The following section details an exemplary implementation of each of the processing blocks.

The user interface 20 can be implemented as a set of presets. Each preset represents a "mixing type" with a set of characteristics. These characteristics can be given as semantic expressions in the form of "mixing rules", and are described below in the context of the description of the command interpreter 30.

A mixing type can be for example the "Dance Mix", the "Ambient Mix", the "Rock Guitar Mix", and others.

These names give a description of the target mixture signal MS in a highly compressed way, yet the user can interpret them (or a subset of them). The ability of the user to interpret the names of the presets is based on conventions and widely-used stylistic classifications. For example, a user may associate a specific playing style and/or sound with the name of a certain artist.

Within the context of the command interpreter 30, a set of mixing rules is assigned to each of the presets using a look-up table. Mixing rules are depicted as logical implications in the form of IF-THEN-statements, as in Fuzzy Logic (J. M. Mendel, "Fuzzy Logic Systems for Engineering: A Tutorial", Proc. of IEEE, vol. 83, pp. 345-377, 1995), as shown here, where a sound object descriptor <SOD> is the antecedent and a mixing operation descriptor <MOD> is the consequent:

| IF | <SOD> | THEN | <MOD> |
| --- | --- | --- | --- |

The IF-THEN-statements specify
- How sound objects SO appear in the mixture signal MS, expressed as mixing operation descriptors (MOD). The MODs are selected according to characteristics of the sound objects, given by the sound object descriptors (SOD).
- Characteristics of the mixture signal MS which are independent of a specific mixing operation descriptor MOD, and specify the parameters of the operations for the mixture signal MS.

A sound object descriptor SOD can be represented as a (data) structure, e.g.:

| | |
| --- | --- |
| SO.ID | Sound object identifier, e.g. name of the performer |
| SO.INSTR | Instrument class of the sound object SO |
| SO.BRIGHTNESS | Perceived brightness of the sound object SO |
| SO.PERCUSSIVENESS | Quantifier for the percussiveness of the SO |
| SO.CHARACTERISTIC | Another characteristic of the sound object SO |

The mixing operation descriptors MOD describe level (i.e. volume), panning position, distance, and other characteristics of a sound object SO which can be perceived in a mixture signal MS. Mixing operation descriptors MOD which are applied to a sound object SO may be designated by SO.MOD within the data structure. The mixing operation descriptors MOD can also be applied to the mixture signal MS. These mixing operation descriptors MOD are designated by MT.MOD. Typically these mixing operation descriptors MOD control the signal processing which is applied to all audio signals or to the mixture signal, e.g. reverberation or dynamic range processing DRP.

A mixing operation descriptor MOD may consist of a perceptual attribute and a value which is assigned to the perceptual attribute. Mixing operation descriptors can be implemented as linguistic variables.

A list of perceptual attributes can contain the following (besides others):

| Perceptual Attribute | Description |
| --- | --- |
| PLOUDLEVEL | perceived level |
| LATERALDISPLACEMENT | the lateral angle with which the sound position deviates from the centre |
| PDISTANCE | the distance at which the sound object SO is perceived |
| FX1LEVEL | perceived amount of DAFx 1 |
| FX2LEVEL | perceived amount of DAFx 2 |
| REVERBLEVEL | perceived amount of reverberation |
| BRIGHTNESS | timbre descriptor |
| DIFFUSENESS | describes how diffuse vs. direct the sound is mixed |

The perceptual attributes can be linguistic variables. The assigned values can be one of the following: {"Very low", "Low", "Medium", "High", "Very high"}.

Perceptual attributes which are not set by a mixing operation descriptor MOD are set to default values.

A mixing rule may then look like this:

```
IF <SO.INSTR=value> AND <SO.C1=value> ...
AND <SO.Cn=value>
THEN <SO.MOD1=value> AND <SO.MOD2=value> ...
AND <SO.MODn=value>
```

It should be noted that the use of conjunction (i.e. "AND") is sufficient and disjunction (i.e. "OR") can be expressed as separate rules.

Exemplary rule set: A set of mixing rules for the use case at hand is given for the example of the Dance Mix:

These mixing rules are specified for instrument classes:

```
1. IF <SO.INSTR="kick drum">
   THEN <SO.PLOUDLEVEL="high"> AND
   <SO.LATERALDISPLACEMENT="zero"> AND
   <SO.DISTANCE="near">
2. IF <SO.INSTR="bass">
   THEN <SO.PLOUDLEVEL="high"> AND
   <SO.LATERALDISPLACEMENT="zero"> AND
   <SO.DISTANCE="near">
3. IF <SO.INSTR="percussion"> AND <SO.ENTROPY="high">
   THEN <SO.PLOUDLEVEL="high"> AND <SO.FXLEVEL="high">
4. IF <SO.INSTR="percussion"> AND <SO.ENTROPY="low">
   THEN <SO.PLOUDLEVEL="low">
```

The following mixing rules are specified for characteristics independently of instrument class:

```
5. IF <SO.INSTR="*"> AND <SO.ENTROPY="low">
   THEN <SO.LATERALDISPLACEMENT="far left">
6. IF <SO.INSTR="*"> AND <SO.CREST="low">
   THEN <SO.PLOUDLEVEL="low">
```

Optionally, mixing rules may be specified for the mixture signal MS. They are not linked to characteristics of the sound objects SO. The resulting operations are applied to all sound objects SO, if no sound object is specified in the IF-part of the mixing rule.

```
7. IF*
   THEN <MS .REVERBLEVEL="low">
8. IF*
   THEN <MS .FX1LEVEL="high">
```

Furthermore, in the IF-part of the rules, the attributes can also be compared to relative values instead of absolute values. This means that an attribute of one sound object SO can be compared to the same attribute of all other sound objects SO using operations like "maximum" or "minimum", e.g.

```
9. IF <SO.INSTR="*"> AND <SO.ENTROPY="maximum">
   THEN <SO.FX2LEVEL="high">
```

It should be noted that the attributes and rules listed above are examples and not meant to be the complete set for the particular mixing preset.

According to an aspect of the teachings disclosed herein, a variation of the rule set may be performed. In particular, the rule set can be implemented to contain concurring rules (rules with the same antecedent but different consequent) of which one is selected arbitrarily (randomized). This introduces variations into the results and thereby increases user satisfaction. It is also beneficial in situations where no uniform rule set can be agreed on in the process of producing the rule set.

Turning now to an exemplary implementation of the semantic audio analysis 40, recall that the semantic audio analysis 40 is applied to gather the information about the plurality of audio tracks ST and possibly the multi-track that may be useful for determining which mixing parameters are to be applied to which one of the plurality of audio tracks ST. The semantic audio analysis processes each audio track ST of the plurality of audio tracks separately and additionally a representation of the multi-track MT. The representation of the multi-track MT may be obtained for example in the form of a mixture signal derived from down-mixing all audio tracks ST with unit gains.

The results can be represented as an array of structures (where each array element contains the meta-data for one audio track ST) and an additional structure containing the meta-data of the multi-track. The variable types of the structure elements can be strings (e.g. for instrument names), scalar values (e.g. for tempo, entropy), or arrays (e.g. for starting times and stop times for the description of playing styles, or dedicated structures for itself (e.g. a structure for describing the form of a musical piece).

An analysis result can be accompanied by a confidence measure which represents the degree of reliability of the respective result.

Example for the representation of a result produced by the semantic audio analysis 40:

```
ST(1).ID = "TR909"
ST(1).INSTRUMENT = "kick drum"
ST(1).INSTRUMENT_CONFIDENCE = 0.93
ST(1).ENTROPY = 0.12
ST(2).ID = "lead guitar"
ST(2).INSTRUMENT = "guitar"
ST(2).INSTRUMENT_CONFIDENCE = 0.68
ST(2).SOLO = [ [123.4 234.5] [567.7 789.0] ]
ST(3).ID = "background vocals"
ST(3).INSTRUMENT = "human singing"
ST(3).INSTRUMENT_CONFIDENCE = 0.8
ST(3).BRIGHTNESS = 0.12
MT.TEMPO="126"
MT.GENRE="electro"
MT.FORM=<form structure>
```

The semantic audio analysis 40 may be useful to standardize the provided multi-track audio material by assigning unique identifiers to the audio tracks ST and to the various time sections of the musical work. In particular, the multi-track audio material typically is not a predefined format following a certain convention. In other words, the audio mixer cannot rely on that a specific audio track (e.g. "track 1") contains a certain instrument (e.g. "guitar"). The meta-data produced by the semantic audio analysis, however, may provide substantially standardized information about the organization and the content of the multi-track signal that assist other modules of the audio mixer to accomplish their respective tasks. The standardization done by the semantic audio analysis is useful, because it allows the mixing command provided by the command interpreter 30 to be related to the encountered situation of the multi-track audio signal. Thus, the command interpreter 30 and the semantic audio analysis 40 "speak the same language".

The target descriptor assignment unit DAU 60 processes the meta-data provided by the semantic audio analysis 40 and the mixing rules from the command interpreter 30 in order to assign mixing operation descriptors to the plurality of audio tracks ST or to segments of the audio tracks ST. These descriptors state how each sound object SO which are dominant in the respective segment of the audio track ST are perceived in the target mixture signal MS.

It is assumed that in each audio track ST only one sound object is dominant at a time. Given this assumption, the attributes derived from the semantic audio analysis 40 (which are computed for each audio track ST) are processed as attributes for the sound object SO. Alternatively, the semantic audio analysis can output more than one attribute structure for each audio track ST if the audio track ST contains multiple sound objects, especially if the several sound objects SO temporally succeed each other within the audio track ST, which means that the several sound objects SO may be relatively easily separated. Another possibility is that a first sound object SO1 is present mainly in the left channel of a stereo signal, while a second sound object SO2 is present mainly in the right channel. Yet another possibility would be that the several sound objects can be separated in the frequency domain by means of low pass, high pass, and/or bandpass filters.

Fuzzy Logic can be applied if the input variables are crisp values, but the rule set is formulated using fuzzy attributes (e.g. "low" or "high"). For example, the degree of variation in the playing of an instrument can be expressed as a scalar value in the range between 0 and 1. Furthermore, the semantic audio analysis 40 can output the meta-data together with confidence values (e.g. probabilities) describing the degree of confidence with which the estimated meta-data has been computed.

Fuzzy Logic allows for modelling complex tasks, often incorporating expert knowledge. It makes use of Fuzzy Sets, which provide a straight-forward mechanism for converting precise values into fuzzy descriptions back and forth.

Figure 6:
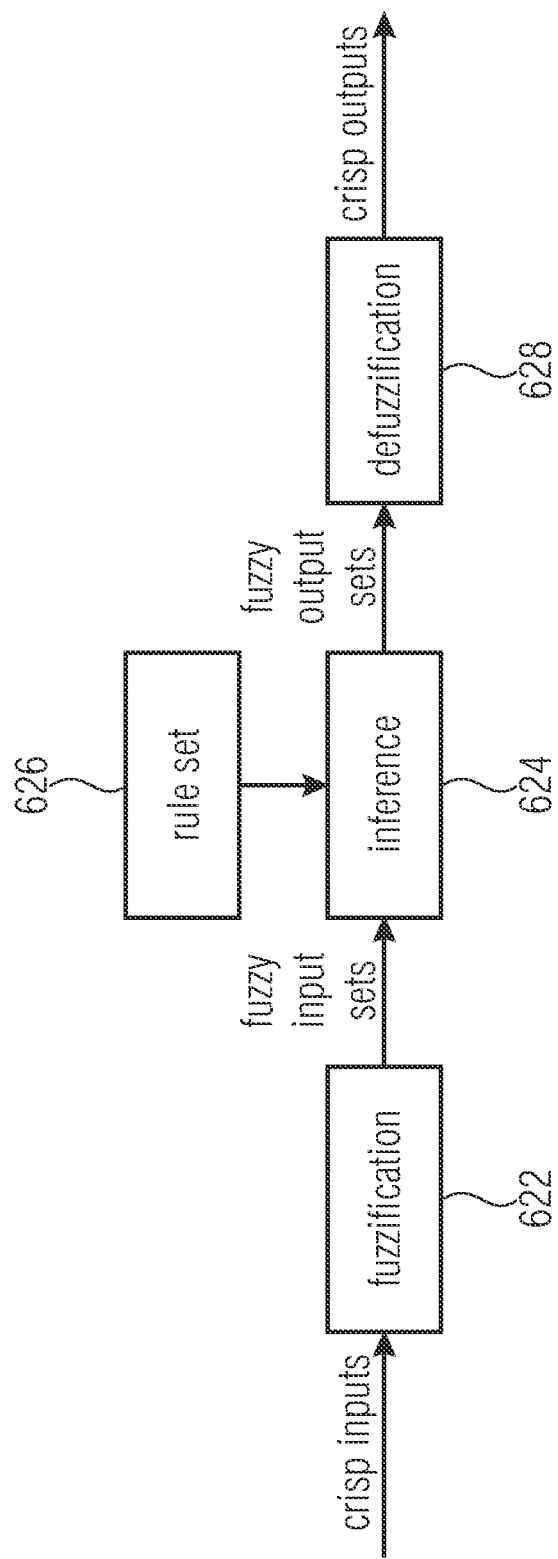
FIG. 6 illustrates a schematic block diagram of a fuzzy logic processor.

An overview of the processing if implemented as a Fuzzy Logic System is shown in the block diagram in FIG. 6 (Mendel, 1995). The Fuzzy Logic System comprises a fuzzification module 622, an inference module 624, a rule set 626, and a defuzzification module 628. The fuzzification module 622 receives a set of crisp inputs, for example from the semantic audio analysis 40. On the basis of the crisp input, the fuzzification 622 produces a fuzzy input set which is fed to the inference module 624. The inference module 624 evaluates the fuzzy input set by means of a rule set 626 that is equally fed to the inference module 624. The rule set 626 may be provided by the command interpreter 30. The inference module 624 produces a fuzzy output set and feeds it to the defuzzification module 628. In the defuzzification module 628 the fuzzy output set is translated to crisp outputs which may then be as the mixing parameters or as intermediate quantities.

Turning now to the fuzzification in more detail, the assignment of mixing operation descriptors MOD to the single audio tracks ST is done on the basis of the criteria described in the IF-part of the rule set determined by the command interpreter 30. If the respective meta-data form the semantic audio analysis 40 are given as real numbers or as strings together with a confidence value (e.g. as the result of the instrument classification), the real numbers are translated into linguistic variables using Fuzzification. Fuzzy Sets are sets whose elements have a degree of membership. This degree of membership can be any real number in the interval [0, 1] (in contrast to classical set theory where the degree of membership is either 0 or 1).

Figure 7:
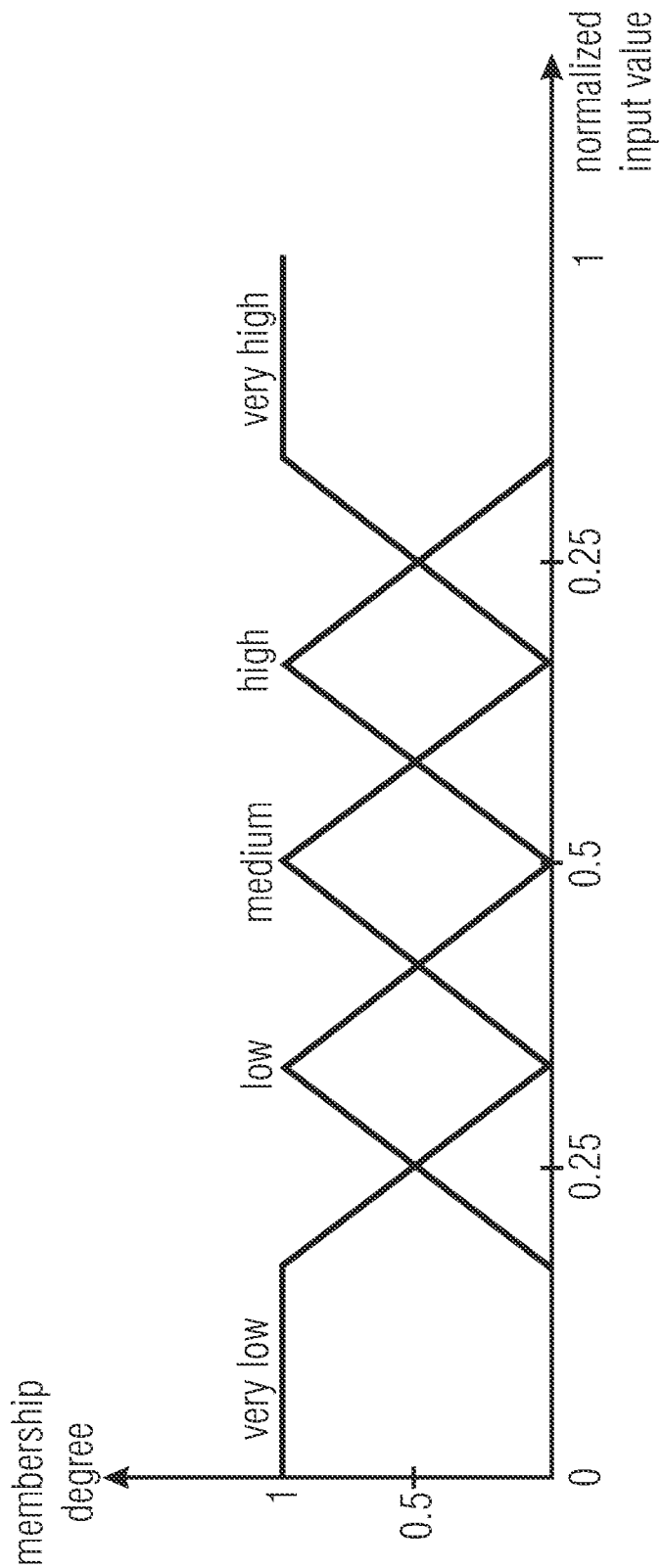
FIG. 7 illustrates an exemplary membership function for a fuzzy set.

The Fuzzification is performed using the membership functions for the Fuzzy Set as exemplarily shown in FIG. 7. In the Fuzzification, for each real-valued input variable the corresponding Fuzzy Set (I. A. Zadeh, "Fuzzy Sets", Information and Control, vol. 8, pp. 338-353, 1965) and the membership degree is determined. For example, given a brightness value of 0.25, the corresponding Fuzzy Sets are "very low" with membership 0.5 and "low" with membership 0.5.

In the Inference step or module 624, Fuzzy Sets for the input variables are mapped to Fuzzy Sets for the output variables using the set of rules 626. The result is again a set of linguistic variables (together with corresponding confidence membership degrees) for the perceptual attributes.

In the following step or module, the Defuzzification 628, the results of the inference are converted into crisp values for the output variables using their corresponding Fuzzy Sets. That is, the variables listed in the above table of perceptual attributes have counter-parts with crisp values.

With respect to the perceptual processor 60, the outputs of the command interpreter 30 and the target descriptor assignment unit 50 determine how each of the sound objects SO should appear in the mixture signal MS. So far, this specification is given by means of the perceptual values.

The perceptual processor 60 translates the perceptual values into the physical mixing parameters by taking the signal characteristics and human hearing mechanisms into account. The following paragraphs illustrate the processing of some perceptual values, namely sound levels, panning coefficients for given lateral angles, reverberation levels and time delays, DAFx parameters, equalization, and dynamic range processing.

Sound levels for the sound objects SO may be computed using a perceptual loudness model, e.g. the model described by Glasberg in 2002.

Alternatively, the loudness model described by Moore in 1996 may be used to compute the loudness of a sound signal within mixtures of sound signals (B. C. J. Moore and B. R. Glasberg, "A Revision of Zwicker's Loudness Model", Acustica—Acta Acustica, vol. 82, pp. 335-345, 1996).

Gain factors for each audio track ST are computed such that the perceived loudness of the sound object SO in the audio track ST (or the mixture signal MS) matches the semantic description as expressed by the mixing operation descriptor MOD.

Panning coefficients for given lateral angles: the perception of lateral position of a sound object SO is determined by inter-aural level differences (ILD) and inter-aural time differences (ITD) at the ear entrances (Lord Rayleigh, "On our perception of Sound Direction", Philosophical Magazine, vol. 6, pp. 214-232, 1907). Within the context of the perceptual processor 60, time delays and level differences are determined for each playback channel such that the perception of lateralization is evoked.

Reverberation levels and time delays: The levels for the artificial reverberation processors are determined such that the perceived amount of reverberation matches the semantic descriptions given by the user. Reverberation levels are defined for each sound object separately and/or for the mixture signal MS. Reverberation levels can be adjusted for each sound object separately in order to evoke the perception of distance for a particular sound object SO. Distance perception is additionally controlled by the level, time delay, equalization curve, and lateral position.

DAFx parameters: Setting the parameters for the digital audio effects depends on the particular DAFx processor. The level of the DAFx-processed signal is computed using a loudness model (e.g. Moore, 1996).

Equalization: Parameters for Equalization are set such that the processed signals match the perceptual attributes relative to the "brightness" of the sound object or the mixture signal MS.

Dynamic range processing: Parameters for the dynamic range processing DRP are set to match perceptual attributes for the dynamic range.

Figure 8:
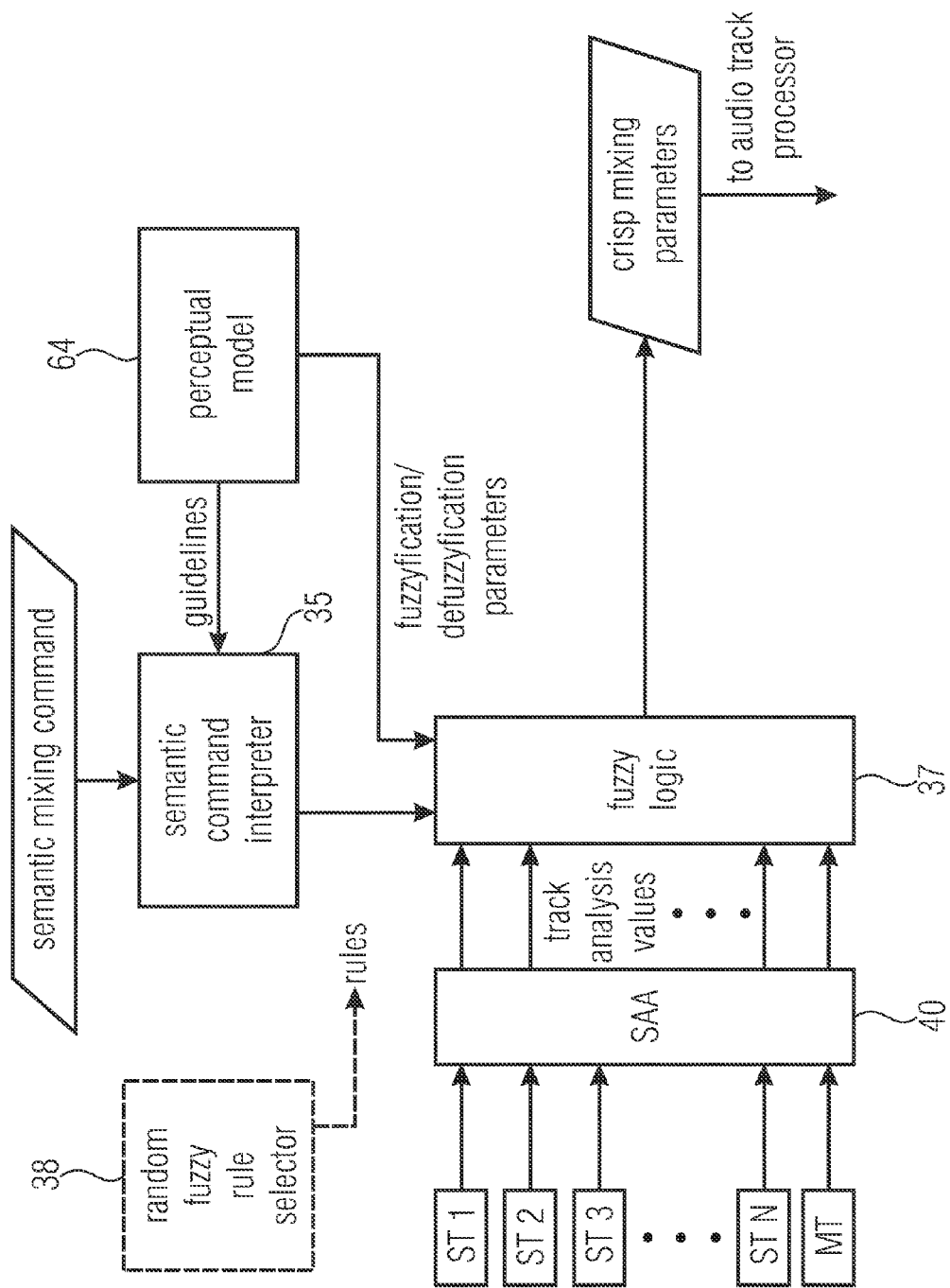
FIG. 8 shows a schematic block diagram of an audio mixer comprising a fuzzy logic processor.

FIG. 8 shows a schematic block diagram of a part of an audio mixer comprising a fuzzy processor 37. An input of the fuzzy processor 37 is connected to the semantic audio analysis 40 and is configured to receive track analysis values via this connection. The track analysis values may be either crisp values are linguistic variables. The fuzzy processor 37 also has an input for receiving rules or rule sets from the semantic command interpreter 35. As explained above, the fuzzy processor 37 uses the rules to process the track analysis values which results in crisp mixing parameters that may be provided to the audio track processor 75.

The rules are created by the semantic command interpreter 35 on the basis of the semantic mixing command provided by the user.

A perceptual model 64 provides fuzzification and defuzzification parameters to the fuzzy logic processor 37. The fuzzification and defuzzification parameters establish a link between numerical values and corresponding semantic descriptions. For example, the fuzzification and defuzzification parameters may specify loudness ranges for audio signals that appear soft, medium, or loud to a listener.

Furthermore, the perceptual model 64 may specify, which mixing parameters are involved when a certain effect is desired. Corresponding values for these mixing parameters may also be specified by the perceptual model 64. These specifications may be provided to the semantic command interpreter 35 as guidelines. The semantic command interpreter 35 may follow these guidelines when creating the fuzzy rules.

The audio mixer may comprise an optional random fuzzy rule selector 38 which is used when two concurring fuzzy rules have been created by the semantic command interpreter 35 and only one can be implemented by the fuzzy logic processor 37. A moderate degree of randomness may increase user satisfaction as the mixing process appears to be more natural and "human". After all, a human mixing engineer may occasionally act slightly randomly, too, which may be perceived as "artistic" by a client of the mixing engineer.

Figure 9:
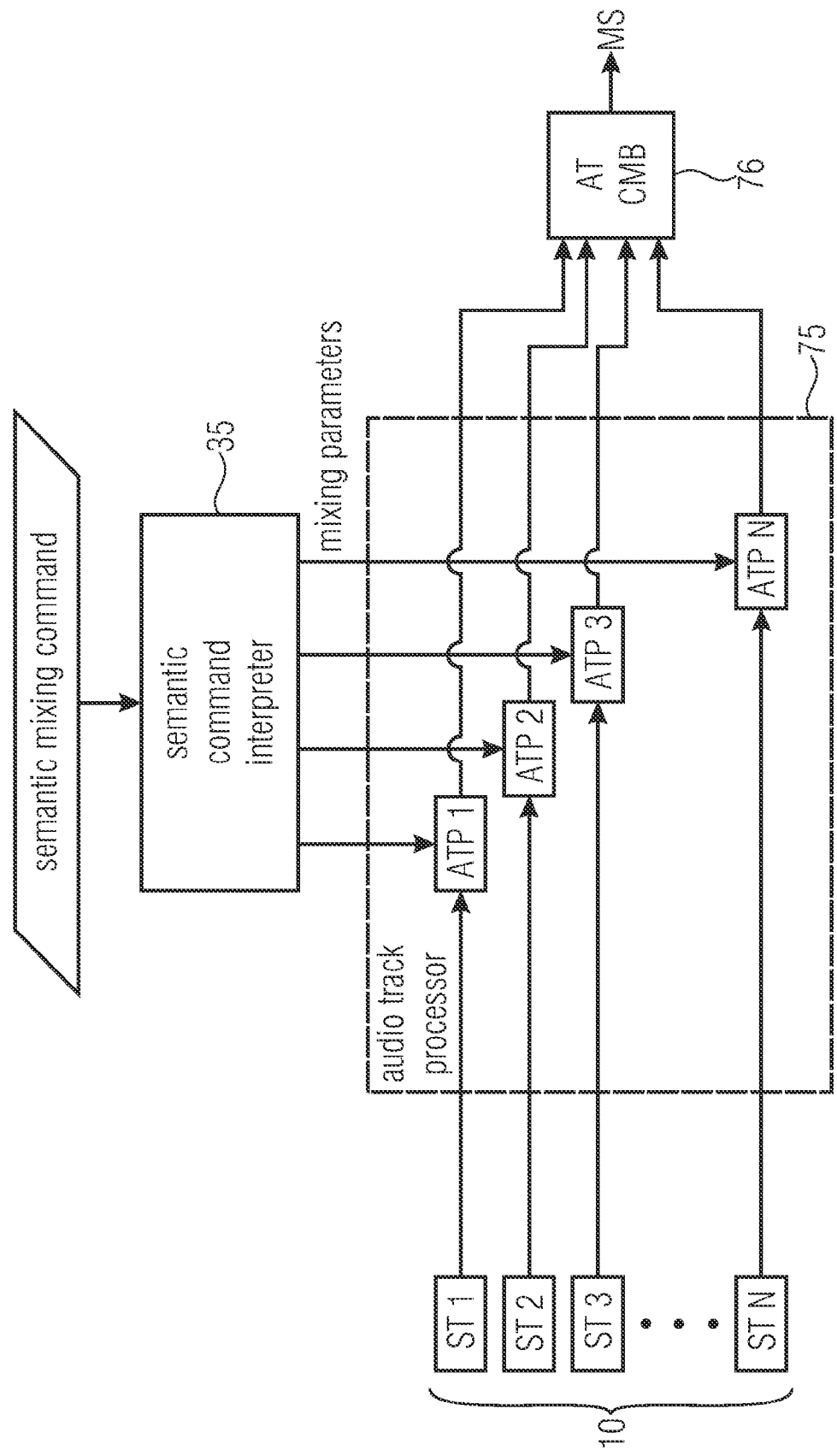
FIG. 9 shows a schematic block diagram of another configuration of an audio mixer according to the teachings disclosed herein.

FIG. 9 shows a schematic block diagram of a possible basic configuration of an audio mixer according to the teachings disclosed herein. The data 10 is provided in the form of a plurality of single audio tracks ST. The audio mixer comprises a semantic command interpreter 35, an audio track processor 75, and an audio track combiner (AT CMB) 76.

The semantic command interpreter 35 corresponds by and large to the command interpreter 30 of FIG. 5. Furthermore, the semantic command interpreter 35 may comprise some functionality of the target descriptor assignment module 50 and the perceptual processor 60. The semantic command interpreter 35 receives a semantic mixing command as an input and derives one mixing parameter or a plurality of mixing parameters from the semantic mixing command. The plurality of mixing parameters are provided to the audio track processor 75 or, to be more precise, to individual audio track processors ATP1, ATP2, ATP3, ATP N of the audio track processor 75. The mixing parameters are typically in the form of crisp values which may be readily implemented by the plurality of individual audio track processors ATP1 to ATP N.

The plurality of individual audio track processors ATP1 to ATP N modify audio signals provided by corresponding ones of the audio tracks ST1 to ST N according to the mixing parameters.

The modified audio signals are combined by the audio track combiner 76 to obtain the mixture signal MS.

In the configuration shown in FIG. 9, the semantic command interpreter 35 is capable of assigning a particular semantic content within the semantic mixing command to the appropriate mixing parameter for the corresponding individual audio track processor ATP1 to ATP N. This ability of the semantic command interpreter 35 may be based on the fact that the plurality of single audio tracks ST1 to ST N are organized according to an agreed standard so that the semantic command interpreter 35 may know which track corresponds to which instrument. In FIGS. 11 to 14, alternative configurations of the audio mixer are depicted and described in the corresponding parts of this description that are capable of deriving information about the organization of the multi-track recording and/or a time structure of the recorded musical work from the data itself.

Figure 10:
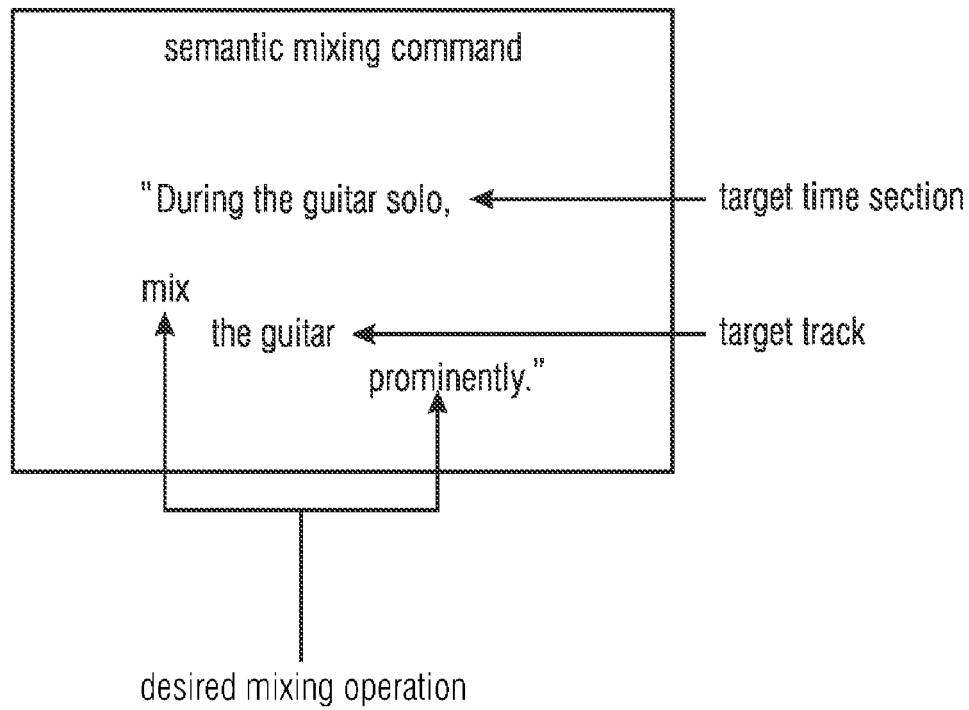
FIG. 10 illustrates a semantic mixing command and its decomposition according to an aspect of the teachings disclosed herein.

FIG. 10 illustrates a semantic mixing command. The semantic mixing command comprises a linguistic expression in the form of a sentence in English language. Of course, other languages may used, as well. The sentence reads: "During the guitar solo, mix the guitar prominently". A semantic analysis of this sentence reveals that the sentence can be decomposed into three parts. A first part contains the expression "during the guitar solo" and can be identified as an expression specifying a target time section for the semantic mixing command. A second part contains the expression "the guitar" and can be identified as an expression specifying a target track. A third part contains the expression "mix [ . . . ] prominently" and can be identified as an expression specifying a desired mixing operation.

Figure 11:
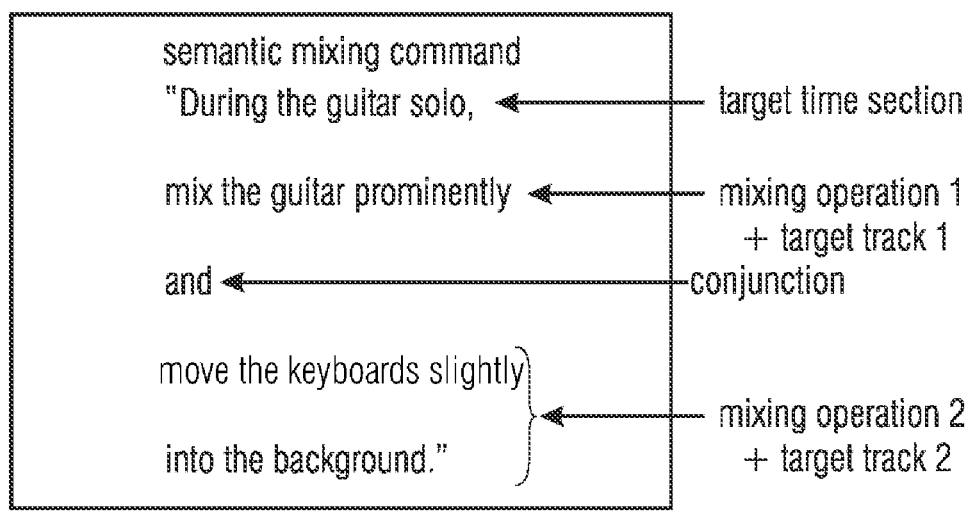
FIG. 11 illustrates another semantic mixing command and its decomposition according to an aspect of the teachings disclosed herein.

FIG. 11 illustrates an extended example of a semantic mixing command. The extended mixing command is based on the semantic mixing command from FIG. 10. In addition, a second mixing operation for a second target track has been added, namely "[ . . . ] move the keyboards slightly into the background". A conjunction is used to specify the relation between the first mixing operation/first target track and the second mixing operation/second target track. In the illustrated case, the conjunction is the word "and" so that the first mixing operation and the second mixing operation are both performed concurrently on their respective target tracks.

Figure 12:
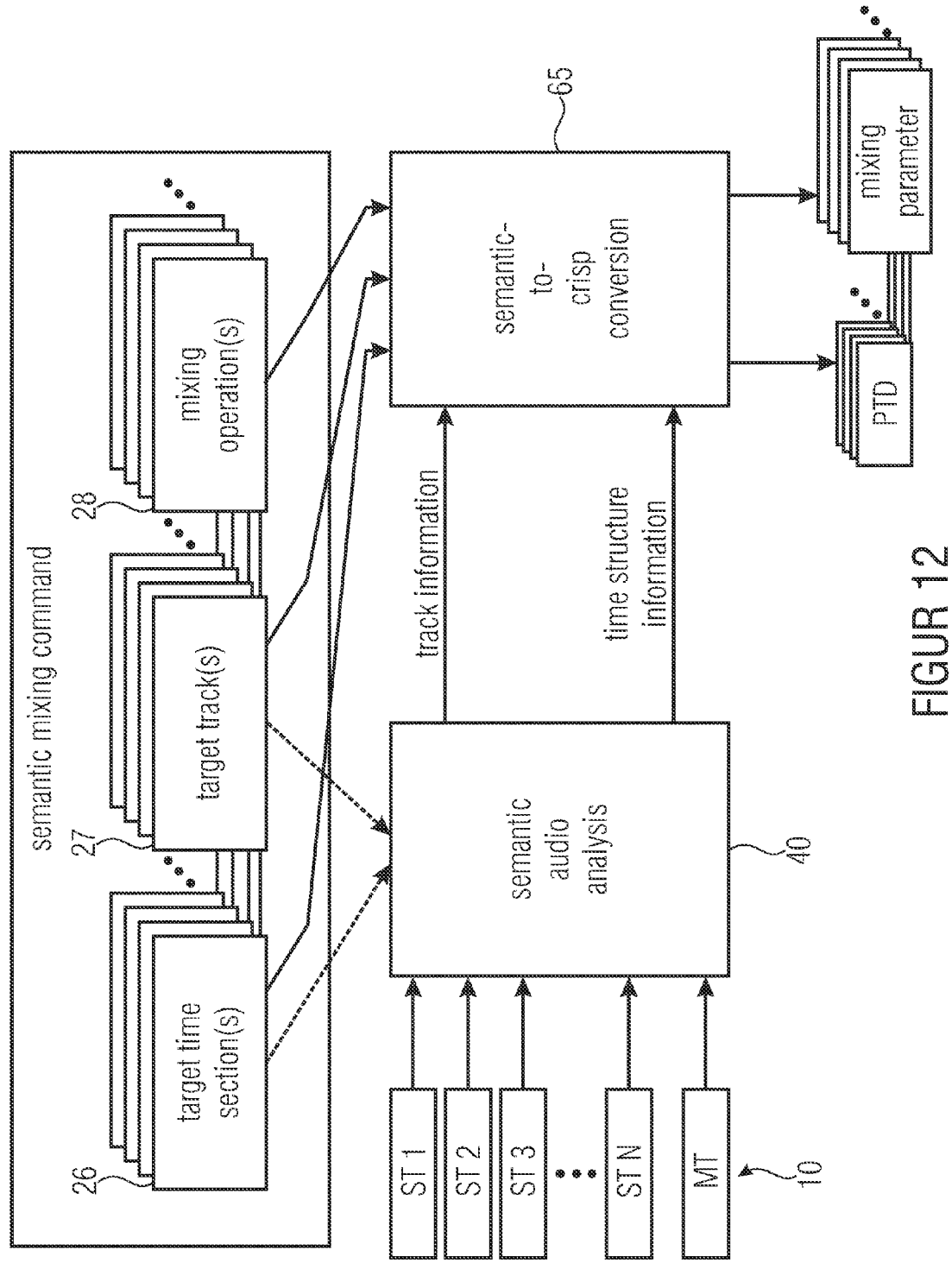
FIG. 12 shows a schematic block diagram of a further configuration of an audio mixer according to the teachings disclosed herein.

FIG. 12 shows a schematic block diagram of a part of an audio mixer according to another possibly configuration. In particular, FIG. 12 shows how the data provided by the plurality of audio signals ST1 to ST N and by a default mixture signal MT ("multi-track") can be used to obtain useful information about the track arrangement and/or the time structure of the musical work. Unless otherwise stated, a reference to the plurality of audio tracks shall include a reference to the default mixture signal MT.

The plurality of audio track ST1 to MT is provided to the semantic audio analysis 40. By analyzing the plurality of audio tracks, track information and time structure information may be obtained, which are provided to a semantic-to-crisp conversion module 65.

The semantic mixing command comprises a plurality of expressions, each expression comprising specifying a target time section 26, a target track 27, and a mixing operation 28.

The semantic-to-crisp conversion module 65 corresponds approximately to the target descriptor assignment unit 50 of FIG. 5. The semantic-to-crisp conversion module 65 also receives information from the semantic mixing command as an input. On the basis of the provided inputs, the semantic-to-crisp conversion module 65 creates one or more perceptual target descriptors PTD and the corresponding mixing parameters. The perceptual target descriptor PTD may contain track identifiers of the affected audio tracks ST1 to ST N, as well as time section information in case only a time section of the affected audio track(s) is affected by the mixing command. Note that the mixing parameters may be crisp values.

The semantic audio analysis 40 may optionally receive the target time section specification 26 and/or the target track specification 27 as an input so that the semantic audio analysis 40 may analyze the plurality of audio tracks ST1 to MT with a particular focus on the provided specifications.

Figure 13:
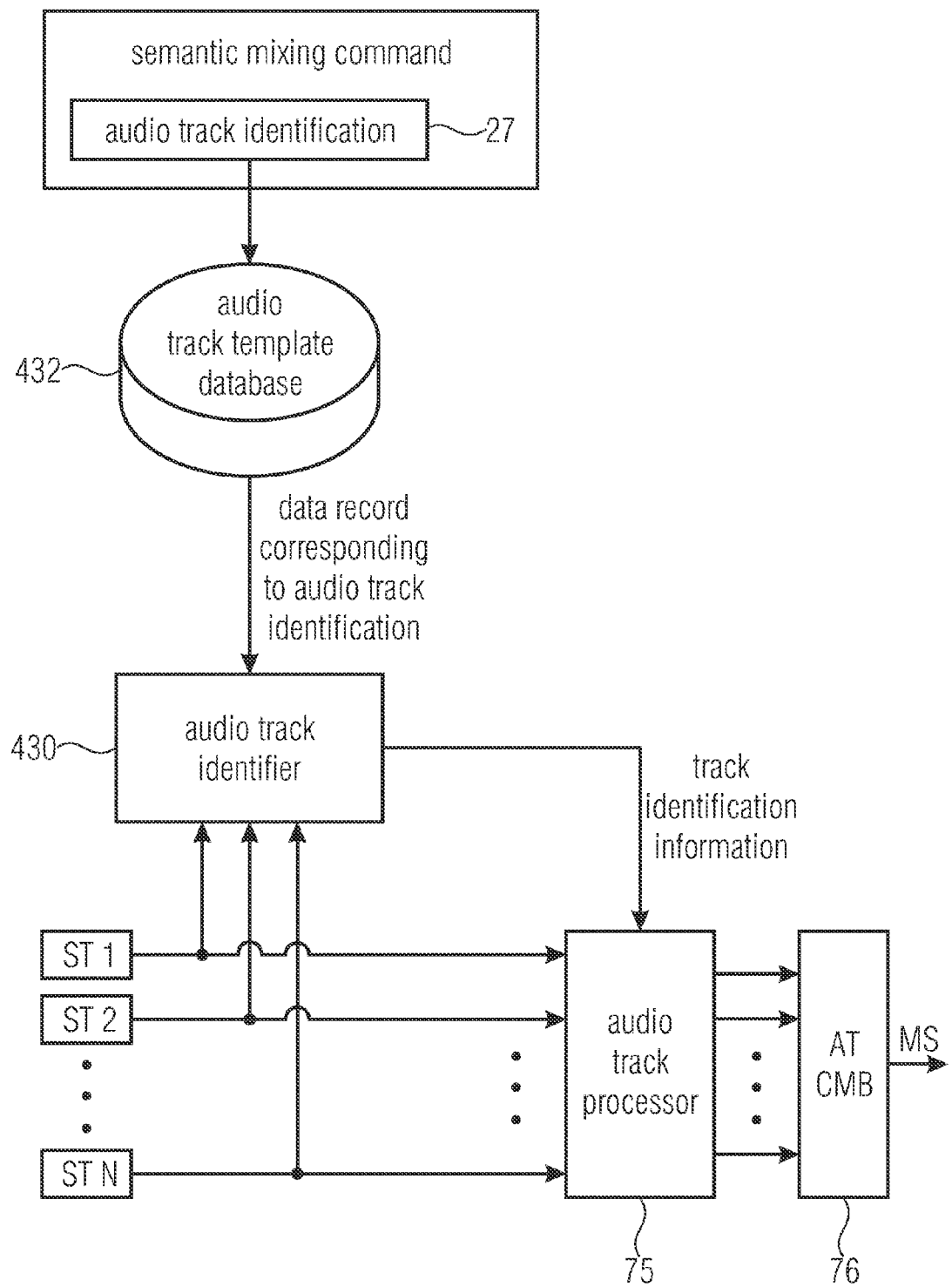
FIG. 13 shows a schematic block diagram of a configuration of an audio mixer according to the teachings disclosed herein comprising an audio track identifier.

FIG. 13 shows a schematic block diagram of another possible configuration of the audio mixer according to the teachings disclosed herein. This configuration features an audio track identifier 430.

The basic structure of the configuration shown in FIG. 13 is substantially the same as in FIG. 9; however some parts have been omitted for the sake of clarity.

As it is not always immediately clear, which audio track ST1 to ST N contains which instrument or vocal part, the audio track identifier 430 may be used to determine this information. The audio track identifier 430 may be a part of the semantic audio analysis 40.

The semantic mixing command comprises a target audio track identification 27 as has been mentioned relative to FIG. 12. The target audio track identification 27 is provided to an audio track template database 432. The audio track template database 432 provides one or more data records that correspond to the target audio track identification 27 and provides it (or them) to the audio track identifier 432. The data record may comprise information about e.g. an instrument in the form of measurement values, sound samples etc. The audio track identifier 430 may then compare the information contained in the data record with the audio signals of each one of the plurality of audio tracks ST1 to ST N. To this end, the audio track identifier may for example perform a cross-correlation of a sound sample from the data record with a short section of the audio track signal. Another option would be to determine the location and magnitude of the overtones of the audio track signal and to compare the result with the corresponding data in the data record. Yet another option is given by analyzing and comparing an attack-decay-sustain-release behaviour of the audio track signal.

The audio track identifier generates track identification information which is provided to the audio track processor 75 so that the audio track processor 75 may process each single audio track ST1 to ST N according to an indication by e.g. an instrument name within the semantic mixing command.

Figure 14:
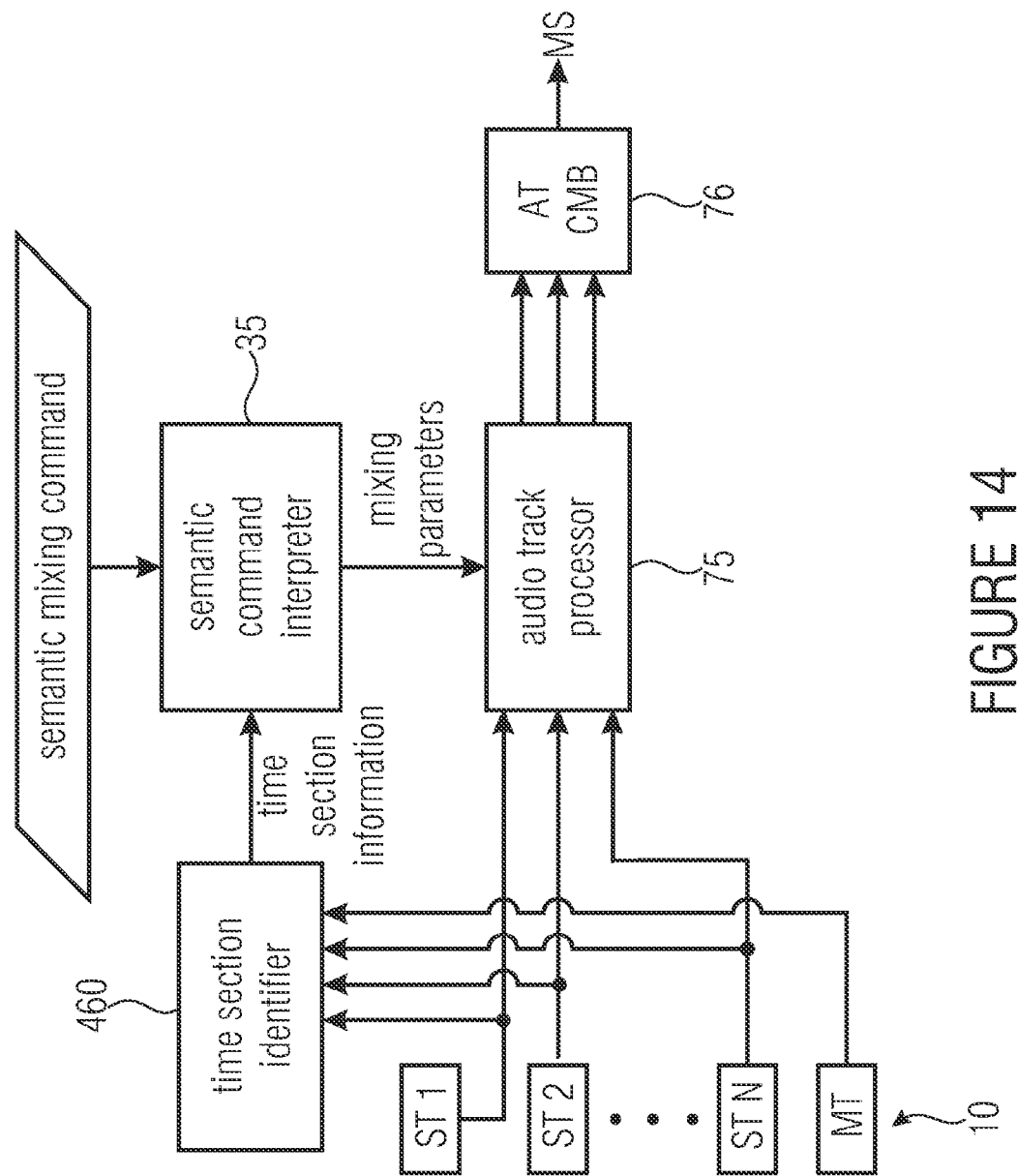
FIG. 14 shows a schematic block diagram of a configuration of an audio mixer according to the teachings disclosed herein comprising a time section identifier.

FIG. 14 shows a schematic block diagram of another possible configuration of the audio mixer in which a time section identifier 460 extracts time section information from the plurality of audio tracks ST 1 to MT. The time section identifier 460 is connected to the plurality of audio tracks ST1 to MT and is configured to analyze a time structure of the musical work that is presented by the audio tracks ST1 to MT. In particular, the time section identifier 460 may look for similar or substantially identical sections within the musical work. If the musical work belongs to the popular music genre, these similar or substantially identical sections are likely the chorus of the song. The time section identifier 460 may also count beats or bars of the musical work which may improve the precision of the time section identification.

The time section information is provided to the semantic command interpreter 35 which uses it to translate a semantic time section expression used within the semantic mixing command to crisp section start and end time values.

The analysis of the time structure of a musical work performed by the time section identifier may employ one or more of the methods proposed by various researchers in the past. In their article "Automatic Music Summarization Based on Music Structure Analysis", ICASSP 2005, Xi Shao et al., the entire content of which being incorporated herein by reference, suggest a novel approach for music summarization based on music structure analysis. In particular, the note onset is first extracted from the audio signal in order to obtain the time tempo of the song. The music structure analysis can be performed on the basis of this tempo information. After music content has been structured into different regions such as Introduction (Intro), Verse, Chorus, Ending (Outro), etc., the final music summary can be created with chorus and music phrases which are included anterior or posterior to selected chorus to get the desired length of the final summary. The music structure analysis distinguishes between melody-based similarity regions (verses) and content-base similarity regions (chorus).

In "Chorus Detection with Combined Use of MFCC and Chroma Features and Image Processing Filters", Proc. of the $10^{th}$ Int. Conference on Digital Audio Effects (DAFx-07), Bordeaux, France, Sep. 10-15, 2007, the author Antti Eronen describes a computationally efficient method for detecting a chorus section in popular rock music. The method utilizes a distance matrix representation that is obtained by summing two separate distance matrices calculated using the mel-frequency cepstral coefficient and pitch chroma features. The entire content of the Eronen article is incorporated herein by reference.

Mark Levy et al. are the authors of an article "Extraction of High-Level Musical Structure from Audio Data and its Application to Thumbnail Generation", ICASSP 2006, the content of which is incorporated herein by reference in its entirety. In the article, a method for segmenting musical audio with a hierarchical timbre model is introduced. New evidence is presented to show that music segmentation can be recast as clustering of timbre features, and a new clustering algorithm, is described.

In "A Chorus Section Detection Method for Musical Audio Signals and Its Application to a Music Listening Station", IEEE Transactions on Audio, Speech, and Language Processing, Vol. 14, No. 5, September 2006, the author Masataka Goto describes a method for obtaining a list of repeated chorus ("hook") sections in compact-disc recordings of popular music. First, a 12-dimensional feature vector called a chroma vector, which is robust with respect to changes of accompaniments, is extracted from each frame of an input signal and then the similarity between these vectors is calculated. The sections identified as being repeated sections are listed and integrated. The method can even detect modulated chorus sections by introducing a perceptually motivated acoustic feature and a similarity that enable detection of a repeated chorus section even after modulation. The entire content of the article is incorporated herein by reference.

An overview of then known automatic music structural analysis methods has been compiled by Bee Suang Ong in his thesis "Structural Analysis and Segmentation of Music Signals", Universitat Pompeu Barcelona, 2007, ISBN 978-84-691-1756-9, the entire content of which is incorporated herein by reference.

Figure 15:
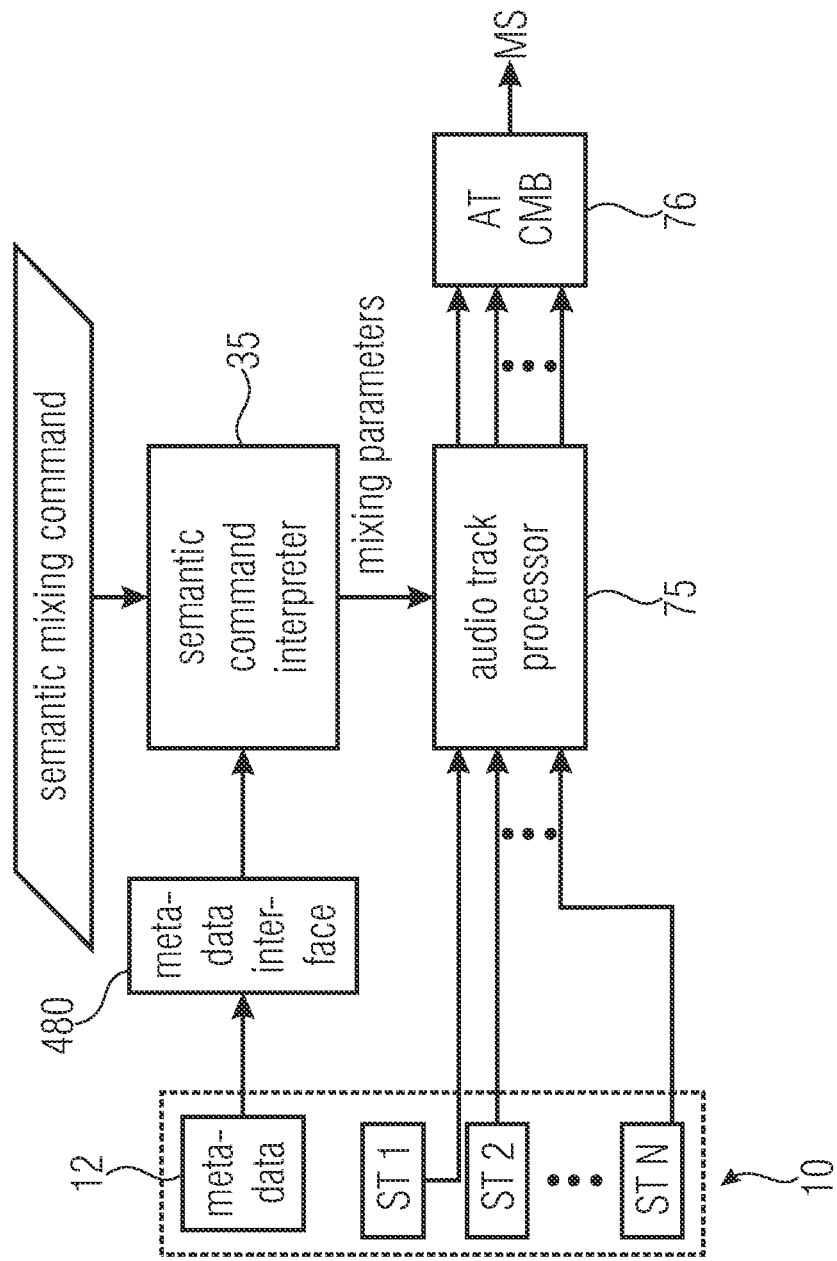
FIG. 15 shows a schematic block diagram of a configuration of an audio mixer according to the teachings disclosed herein comprising a meta-data interface.

FIG. 15 shows a schematic block diagram of a further possible configuration of the audio mixer in which a meta-data interface 480 is provided to exploit meta-data 12 supplied together with the multi-track signal. The meta-data may comprise information about the audio track organization or time section information as explained in the context of FIGS. 12 and 13.

The meta-data 12, if present, saves the audio mixer from having to determine audio track information, time section information, or other useful information from the multi-track signal. Such a determination may involve computationally intensive data processing tasks, which may take a relatively long time. Moreover, the results of the determination performed by the audio mixer itself may be less reliable than meta-data provided produced and provided by an originator of the multi-track audio signal.

The meta-data interface 480 is configured to extract the meta-data 12 from the data 12 of the multi-track recording. At an output side, the meta-data interface 480 is connected to an input of the semantic command interpreter 35. In the configuration shown in FIG. 15, the semantic command interpreter 35 is configured to use the meta-data 12 provided by the meta-data interface 480 in the process of deriving the plurality of mixing parameters from the semantic mixing command.

Figure 16:
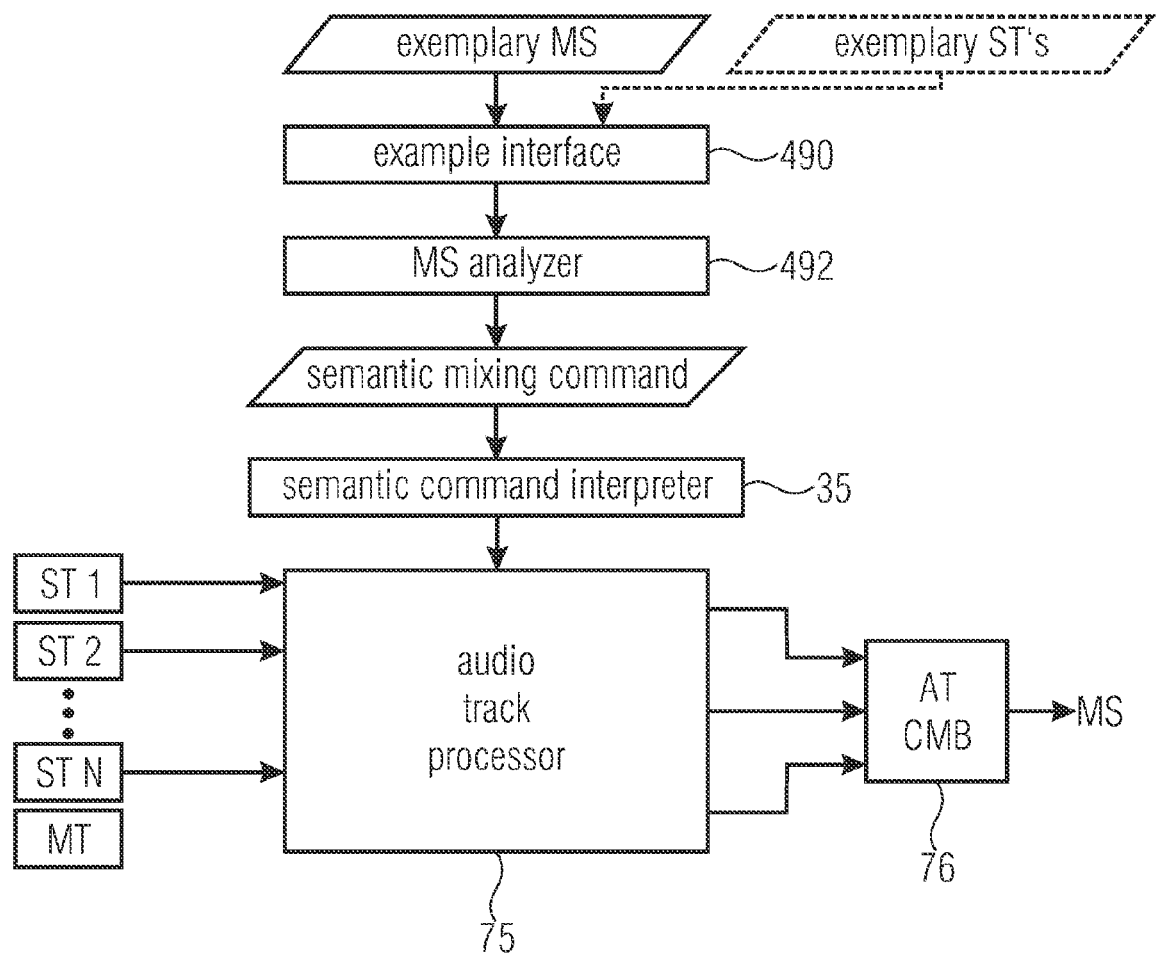
FIG. 16 shows a schematic block diagram of a configuration of an audio mixer according to the teachings disclosed herein comprising an example interface for receiving exemplary mixture signals.

FIG. 16 shows a schematic block diagram of another possible configuration of the audio mixer in which an example interface 490 and an exemplary mixture signal analyzer 492 are provided for generating the semantic mixing command on the basis of an exemplary mixture signal.

The example interface 490 is configured to receive an exemplary mixture signal. The exemplary mixture signal may for example be stored in a memory or retrieved over a network. The user may select the exemplary mixture signal from a collection of exemplary mixture signals according to his/her preferences, for example because he/she likes how a particular mixture signal has been mixed. In general, any audio signal may be used as the exemplary mixture signal, but better results typically are to be expected, if the exemplary mixture signal has a structure and style that is similar to the multi-track recording. For example, it may be useful if the instrumentation of the exemplary mixture signal is substantially the same as the instrumentation of the multi-track signal to be mixed by the audio mixer.

The example interface 490 forwards the exemplary mixture signal to the mixture signal analyzer 492. The mixture signal analyzer 492 may be configured to identify instrument and vocal parts in the exemplary mixture signal. Furthermore, the mixture signal analyzer 492 may determine relative loudness levels and/or frequency curves of the identified instrumental parts, the identified vocal parts, and/or the exemplary mixture signal as a whole. It may also be possible to determine an amount of an audio effect, such as reverberation. Based on the determined values, the mixture signal analyzer 492 may establish a profile of the exemplary mixture signal and/or a semantic mixing command. For example, the analysis performed by the mixture signal analyzer 492 may reveal that a drum track and a bass track of the exemplary mixtures signal are relatively prominent, while other tracks are softer. Accordingly, the semantic mixing command may comprise an expression stating that the drum track and the bass track shall be prominent throughout the mixture signal MS to be produced by the audio mixer.

The example interface 490 may also be configured to receive exemplary audio tracks along with the exemplary mixture signal. The exemplary audio tracks are represented by a dashed rhomboid marked "exemplary ST's" in FIG. 16. The exemplary audio tracks are provided to the mixture signal analyzer 492 by the example interface 490. The exemplary audio tracks correspond to the exemplary mixture signal in that the exemplary audio tracks were used to generate the exemplary mixture signal. With the exemplary audio tracks being available, the mixture signal analyzer 492 may compare the exemplary mixture signal with each one of the exemplary audio tracks in order to find out how a certain exemplary mixture signal has been modified before being mixed into the exemplary mixture signal. In this manner, track-related mixing parameters may be determined by the mixture signal analyzer 492 in semantic form or semi-semantic form.

Figure 17:
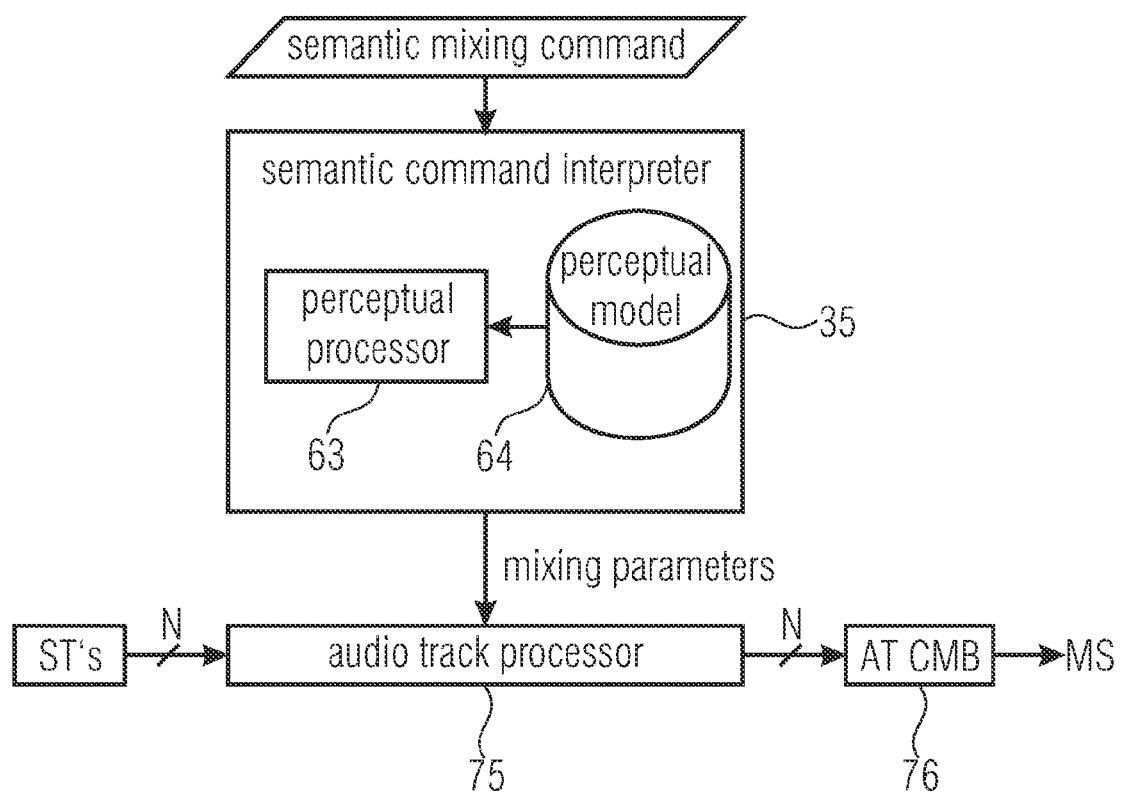
FIG. 17 shows a schematic block diagram of a configuration of an audio mixer according to the teachings disclosed herein comprising a perceptual processor and a perceptual model.

FIG. 17 shows a schematic block diagram of another possible configuration of the audio mixer in which a perceptual processor 63 and a perceptual model 64 are used in the process of converting the semantic mixing command to mixing parameters. The perceptual processor 63 and the perceptual model 64 are depicted as parts of the semantic command interpreter 35 in the configuration of FIG. 17. As stated above, the perceptual processor 63 translates the perceptual values into the physical mixing parameters by taking the signal characteristics and human hearing mechanisms into account. The parameters describing the human hearing mechanisms are provided by the perceptual model 64. The perceptual model 64 may be organized as a database or knowledge base. The entries of the database may comprise a semantic description of a hearing related phenomenon and a corresponding implementation in the form of parameters for audio effects, loudness, relative loudness, frequency content, etc. The hearing related phenomenon may be described for example by expressions such as "distant", "near", "flat", "full", "bright", "biased towards low frequencies", "biased towards high frequencies", etc. The corresponding implementation may comprise numerical values that indicate how the mixing parameters for one or more of the plurality of audio tracks ST should be chosen to achieve the desired effect. This mapping from a semantic description to corresponding values of the mixing parameters is typically based on expert knowledge and psychoacoustics. The expert knowledge and the psychoacoustics may have been obtained during elaborate scientific tests and studies.

The configurations shown in FIGS. 8 and 11 to 16 may be combined with each other in any combination. For example, by combining the configurations shown in FIGS. 12 and 13, an audio mixer comprising an audio track identifier 430 and a time section identifier 460 may be provided.

Figure 18:
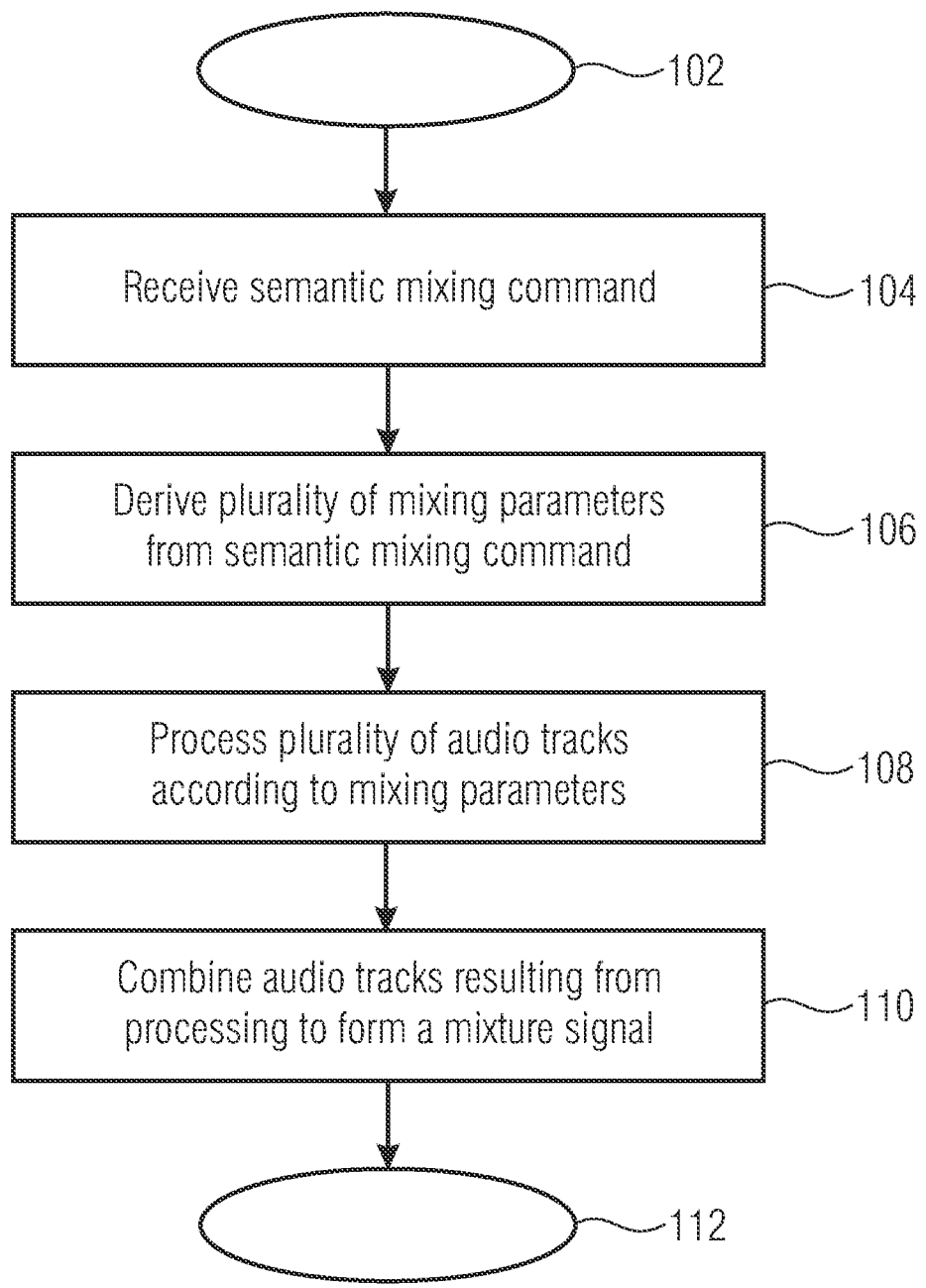
FIG. 18 shows a schematic flow diagram of a method for mixing a plurality of audio tracks to a mixture signal according to the teachings disclosed herein.

FIG. 18 shows a schematic flow diagram of a method for mixing a plurality of audio signals to a mixture signal. After a start of the method at 102, a semantic mixing command is received, as illustrated by block 104. The semantic mixing command may be input by a user in text form using a keyboard, orally as a spoken command, as a selection from a plurality of presets, by adjusting one or more parameters, as an exemplary mixture signal, or in another manner.

At an action represented by the block 106, a plurality of mixing parameters is derived from the semantic mixing command. This action may involve expert knowledge and psychoacoustics so that the mixing parameters lead to a result desired by the user.

The plurality of audio tracks is processed according to the mixing parameters in the context of an action represented by the block 108. The processing of the plurality of audio tracks may comprise setting loudness levels, panning positions, audio effects, frequency filtering (equalizing), and other modifications.

At an action represented by the block 110, the audio tracks resulting from the processing are combined to form a mixture signal, before the method ends at a block 112.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blue-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. An audio mixer for mixing a plurality of audio tracks to a mixture signal, the audio mixer comprising:
    a semantic audio analysis that obtains track information by analyzing the plurality of audio tracks;
    a semantic command interpreter that receives a semantic mixing command and that derives a plurality of mixing parameters for the plurality of audio tracks from the semantic mixing command, wherein the track information is provided to a semantic-to-crisp conversion module that receives information derived from the semantic mixing command and creates the plurality of mixing parameters based on the track information and the information derived from the semantic mixing command;
    an audio track processor for processing the plurality of audio tracks in accordance with the plurality of mixing parameters; and
    an audio track combiner for combining the plurality of audio tracks processed by the audio track processor into the mixture signal.

2. The audio mixer according to claim 1, wherein the semantic command interpreter comprises a vocabulary database for identifying semantic expressions within the semantic mixing command.

3. The audio mixer according to claim 1, further comprising an audio track identifier for identifying a target audio track among the plurality of audio tracks, the target audio track being indicated within the semantic mixing command by an audio track identification expression.

4. The audio mixer according to claim 3, wherein the audio track identifier is configured
    to retrieve a data record that corresponds to the audio track identification expression from an audio track template database, the data record comprising information about a corresponding musical instrument in the form of at least one of a measurement value and a sound sample,
    to perform an analysis of at least one of a timbre, a rhythmic structure, a frequency range, a sound sample, and a harmonic density of at least one audio track among the plurality of audio tracks,
    to compare a result of the analysis with the data record resulting in at least one matching score, and
    to determine the target audio track on the basis of the at least one matching score between the at least one audio track and the data record.

5. The audio mixer according to claim 1, further comprising a time section identifier for identifying a target time section within the plurality of audio tracks, the target time section being indicated within the semantic mixing command by a time section identification expression.

6. The audio mixer according to claim 5, wherein the time section identifier is configured to structure the plurality of audio tracks into a plurality of time sections.

7. The audio mixer according to claim 5, wherein the time section identifier is configured to perform an analysis of the plurality of audio tracks for determining at least one time instant at which a change of a characteristic property of an audio signal represented by the plurality of audio tracks occurs, and for using the at least one determined time instant as at least one boundary between two adjacent time sections.

8. The audio mixer according to claim 1, further comprising a meta-data interface for receiving meta-data relative to the plurality of audio tracks, the meta-data being indicative of at least one of a track name, a track identifier, a time structure information, an intensity information, spatial attributes of an audio track or a part thereof, timbre characteristics, and rhythmic characteristics.

9. The audio mixer according to claim 1, further comprising a command interface for receiving the semantic mixing command in a linguistic format.

10. The audio mixer according to claim 1, further comprising
    an example interface for receiving another mixture signal as an exemplary mixture signal according to a user's preferences relative to how the exemplary mixture signal has been mixed, and
    a mixture signal analyzer for analyzing the exemplary mixture signal and for generating the semantic mixing command based on the analyzing of the exemplary mixture signal.

11. The audio mixer according to claim 1, wherein the semantic command interpreter comprises a perceptual processor for transforming the semantic mixing command into the plurality of mixing parameters according to a perceptual model of hearing-related properties of the mixture signal.

12. The audio mixer according to claim 1, wherein the semantic command interpreter comprises a fuzzy logic processor for receiving at least one fuzzy rule derived from the semantic mixing command by the semantic command interpreter, and for generating the plurality of mixing parameters on the basis of the at least one fuzzy rule.

13. The audio mixer according to claim 12, wherein the fuzzy logic processor is configured to receive at least two concurring fuzzy rules prepared by the semantic command interpreter, and wherein the audio mixer further comprises a random selector for selecting one concurring fuzzy rule among the at least two concurring fuzzy rules.

14. The audio mixer according to claim 1, wherein the semantic command interpreter comprises:
    a target descriptor assignment unit for selecting at least one part of a multi-track signal comprising the plurality of audio tracks and assigning at least one appropriate perceptual target descriptor to the at least one part of the multi-track signal on the basis of the semantic mixing command; and
    a perceptual processor for translating perceptual values defined in the at least one perceptual target descriptor into the mixing parameters by taking signal characteristics and human hearing mechanisms into account.

15. A method for mixing a plurality of audio tracks to a mixture signal, the method comprising:
    receiving a semantic mixing command;
    obtaining track information by analyzing the plurality of audio tracks;
    deriving a plurality of mixing parameters for the plurality of audio tracks from the semantic mixing command, wherein the track information is provided to a semantic-to-crisp conversion module that receives information derived from the semantic mixing command and creates the plurality of mixing parameters based on the track information and the information derived from the semantic mixing command;
    processing the plurality of audio tracks in accordance with the plurality of mixing parameters; and
    combining the plurality of audio tracks resulting from the processing of the plurality of audio tracks to form the mixture signal.

16. The method according to claim 15, further comprising:
    selecting at least one part of a multi-track signal comprising the plurality of audio tracks and assigning at least one appropriate perceptual target descriptor to the at least one part on the basis of the semantic mixing command; and translating perceptual values defined in the at least one perceptual target descriptor into the mixing parameters by taking signal characteristics and human hearing mechanisms into account.

17. A non-transitory computer readable medium including a computer program for instructing a computer to perform the method of claim 15.

18. An audio mixer for mixing a plurality of audio tracks to a mixture signal, the audio mixer comprising:
a semantic audio analysis that obtains track information by analyzing the plurality of audio tracks;
a semantic command interpreter for receiving a semantic mixing command and for deriving a plurality of mixing parameters for the plurality of audio tracks from the semantic mixing command, wherein the track information is provided to a semantic-to-crisp conversion module that receives information derived from the semantic mixing command and creates the plurality of mixing parameters based on the track information and the information derived from the semantic mixing command;
an audio track processor for processing the plurality of audio tracks in accordance with the plurality of mixing parameters;
an audio track combiner for combining the plurality of audio tracks processed by the audio track processor into the mixture signal; and
an audio track identifier for identifying a target audio track among the plurality of audio tracks, the target audio track being indicated within the semantic mixing command by an audio track identification expression, the audio track identifier being configured to retrieve a data record that corresponds to the audio track identification expression from an audio track template database, the data record comprising information about a corresponding musical instrument in the form of at least one of a measurement value and a sound sample, to analyze the audio tracks, and to compare audio signals of the audio tracks with the data record, in order to determine one audio track or several audio tracks that appear to match the target audio track.

19. A method for mixing a plurality of audio tracks to a mixture signal, the method comprising:
receiving a semantic mixing command;
obtaining track information by analyzing the plurality of audio tracks;
deriving a plurality of mixing parameters for the plurality of audio tracks from the semantic mixing command, the plurality of mixing parameters comprising a mixing parameter for a target audio track, wherein the track information is provided to a semantic-to-crisp conversion module that receives information derived from the semantic mixing command and creates the plurality of mixing parameters based on the track information and the information derived from the semantic mixing command;
identifying a target audio track being indicated within the semantic mixing command by an audio track identification expression;
retrieving, from an audio track template database, a data record that corresponds to the audio track identification expression, the data record comprising information about a corresponding musical instrument in the form of at least one of a measurement value and a sound sample;
identifying the target audio track among the plurality of audio tracks by analyzing audio signals of the audio tracks and comparing them with the data record, to determine one audio track or several audio tracks that appear to match the target audio track;
processing the plurality of audio tracks in accordance with the plurality of mixing parameters; and
combining the plurality of audio tracks resulting from the processing of the plurality of audio tracks to form the mixture signal.

20. A non-transitory computer readable medium including a computer program for instructing a computer to perform the method of claim 19.

* * * * *